(12) United States Patent
Inaba

(10) Patent No.: US 12,391,245 B2
(45) Date of Patent: Aug. 19, 2025

(54) VEHICLE CONTROL DEVICE

(71) Applicant: Hitachi Astemo, Ltd., Hitachinaka (JP)

(72) Inventor: Ryoh Inaba, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 428 days.

(21) Appl. No.: 17/611,276

(22) PCT Filed: May 12, 2020

(86) PCT No.: PCT/JP2020/018908
§ 371 (c)(1),
(2) Date: Nov. 15, 2021

(87) PCT Pub. No.: WO2020/235386
PCT Pub. Date: Nov. 26, 2020

(65) Prior Publication Data
US 2022/0234580 A1  Jul. 28, 2022

(30) Foreign Application Priority Data
May 22, 2019 (JP) ................. 2019-095641

(51) Int. Cl.
B60W 30/095 (2012.01)
(52) U.S. Cl.
CPC ... *B60W 30/0956* (2013.01); *B60W 2520/105* (2013.01); *B60W 2554/802* (2020.02); *B60W 2556/40* (2020.02)
(58) Field of Classification Search
None
See application file for complete search history.

(56) References Cited

U.S. PATENT DOCUMENTS 9,495,874 B1* 11/2016 Zhu ............... B60W 60/00133
10,377,375 B2* 8/2019 Jones ............... B60W 60/0011
(Continued)

FOREIGN PATENT DOCUMENTS

| CN | 103635947 A | 3/2014 |
|---|---|---|
| CN | 106103232 A | 11/2016 |

(Continued)

OTHER PUBLICATIONS

D. González, V. Milanés, J. Pérez and F. Nashashibi, "Speed profile generation based on quintic Bézier curves for enhanced passenger comfort," 2016 IEEE 19th International Conference on Intelligent Transportation Systems (ITSC), Rio de Janeiro, Brazil, 2016, pp. 814-819, (Year: 2016).*

(Continued)

*Primary Examiner* — Jelani A Smith
*Assistant Examiner* — Jacob Daniel Underbakke
(74) *Attorney, Agent, or Firm* — Foley & Lardner LLP

(57) ABSTRACT

The present invention provides a vehicle control device capable of ensuring safety and ride comfort. The device includes: a self-location estimation processing unit 306 estimating self location (absolute position information on a map) of a vehicle by matching sensor information obtained from external sensors 2 to 5 mounted in the vehicle with map information including future information as a point group; a solid object movement predicting unit 307 predicting movement of an object as a factor of obstructing the matching with the map information; and a driving movement candidate generating unit (driving movement planning unit) 309 making a driving movement plan of the vehicle on the basis of a result of predicting movement of the obstructive factor object, a result of presuming a road situation at future time, and an estimation result of a position error of the vehicle at future time.

12 Claims, 16 Drawing Sheets

(56) References Cited

U.S. PATENT DOCUMENTS

| | | | |
|---|---|---|---|
| 11,092,690 B1* | 8/2021 | Meier | G01S 17/89 |
| 2014/0136015 A1* | 5/2014 | Hayakawa | G08G 1/167 |
| | | | 701/1 |
| 2014/0330479 A1* | 11/2014 | Dolgov | G01S 13/865 |
| | | | 701/28 |
| 2016/0257342 A1* | 9/2016 | Ueda | B62D 15/026 |
| 2017/0113686 A1 | 4/2017 | Horita et al. | |
| 2017/0314954 A1* | 11/2017 | Golding | G01C 21/3644 |
| 2018/0056995 A1 | 3/2018 | Deng et al. | |
| 2018/0059674 A1 | 3/2018 | Kunisa et al. | |
| 2018/0061237 A1* | 3/2018 | Erickson | G08G 1/0112 |
| 2018/0086336 A1* | 3/2018 | Jones | B60W 50/02 |
| 2018/0120115 A1* | 5/2018 | Shikimachi | G01C 21/165 |
| 2018/0164827 A1* | 6/2018 | Chu | B60W 60/0016 |
| 2018/0204072 A1* | 7/2018 | Al Rasheed | B60R 1/00 |
| 2018/0375185 A1* | 12/2018 | Kirino | H01P 5/107 |
| 2019/0019062 A1* | 1/2019 | Fukui | G06V 20/58 |
| 2019/0061748 A1 | 2/2019 | Baba | |
| 2019/0063943 A1* | 2/2019 | Sunil Kumar | G05D 1/027 |
| 2019/0146500 A1* | 5/2019 | Yalla | G01C 21/3407 |
| | | | 701/25 |
| 2019/0219699 A1* | 7/2019 | Ahn | G01S 5/163 |
| 2019/0220012 A1* | 7/2019 | Zhang | B60W 50/0225 |
| 2019/0243371 A1* | 8/2019 | Nister | G05D 1/0223 |
| 2019/0337509 A1* | 11/2019 | Shalev-Shwartz | B60W 30/09 |
| 2019/0367022 A1* | 12/2019 | Zhao | B60W 30/18154 |
| 2019/0384302 A1* | 12/2019 | Silva | G06V 10/764 |
| 2020/0111233 A1* | 4/2020 | Thyagharajan | G06T 7/73 |
| 2020/0208992 A1* | 7/2020 | Fowe | G01C 21/3811 |
| 2020/0225669 A1* | 7/2020 | Silva | B60W 60/0011 |
| 2020/0257301 A1* | 8/2020 | Weiser | G08G 1/163 |
| 2020/0341474 A1* | 10/2020 | Zuo | B60W 30/0953 |

FOREIGN PATENT DOCUMENTS

| | | | |
|---|---|---|---|
| CN | 107783535 A | 3/2018 | |
| CN | 107792079 A | 3/2018 | |
| JP | 2009-086788 A | 4/2009 | |
| JP | 2014-089138 A | 5/2014 | |
| JP | 2016-162196 A | 9/2016 | |
| JP | 2017-146893 A | 8/2017 | |
| JP | 2018-062261 A | 4/2018 | |
| KR | 20170083233 A | 7/2017 | |
| WO | WO-2013005092 A1 * | 1/2013 | B62D 5/0457 |

OTHER PUBLICATIONS

Y. Wang, J.-R. Chardonnet and F. Merienne, "Speed Profile Optimization for Enhanced Passenger Comfort: An Optimal Control Approach," 2018 21st International Conference on Intelligent Transportation Systems (ITSC), Maui, HI, USA, 2018, pp. 723-728, (Year: 2018).*

E. S. Lee and D. Kum, "Feature-based lateral position estimation of surrounding vehicles using stereo vision, " 2017 IEEE Intelligent Vehicles Symposium (IV), Los Angeles, CA, USA, 2017, pp. 779-784, doi: 10.1109/IVS.2017.7995811. (Year: 2017).*

H.-P. Chiu, M. Sizintsev, X. S. Zhou, P. Miller, S. Samarasekera and R. Kumar, "Sub-meter vehicle navigation using efficient premapped visual landmarks," 2016 IEEE 19th International Conference on Intelligent Transportation Systems (ITSC), Rio de Janeiro, Brazil, 2016, pp. 505-512, (Year: 2016).*

V. Murali, H.-P. Chiu, S. Samarasekera and R. T. Kumar, "Utilizing semantic visual landmarks for precise vehicle navigation," 2017 IEEE 20th International Conference on Intelligent Transportation Systems (ITSC), Yokohama, Japan, 2017, pp. 1-8, (Year: 2017).*

International Search Report with English translation and Written Opinion issued in corresponding application No. PCT/JP2020/018908 dated Sep. 1, 2020.

Chinese Office Action issued in corresponding Chinese Application No. 202080035575, dated Jan. 24, 2024 with Machine translation (19 pages).

* cited by examiner

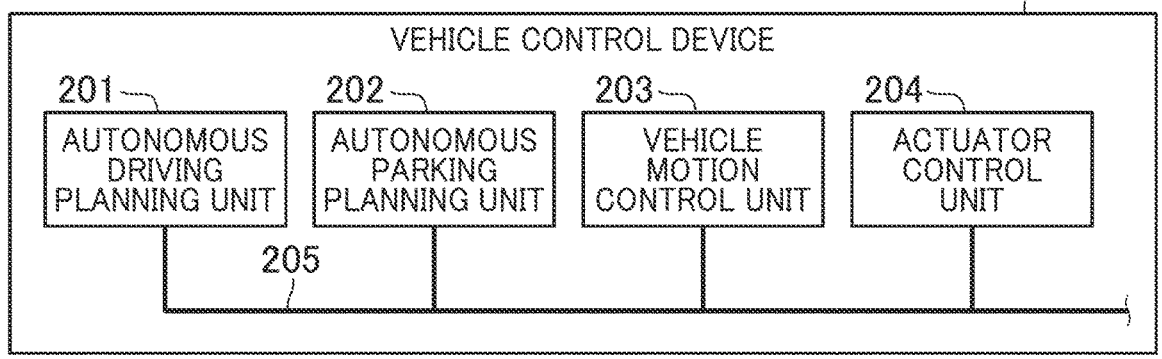
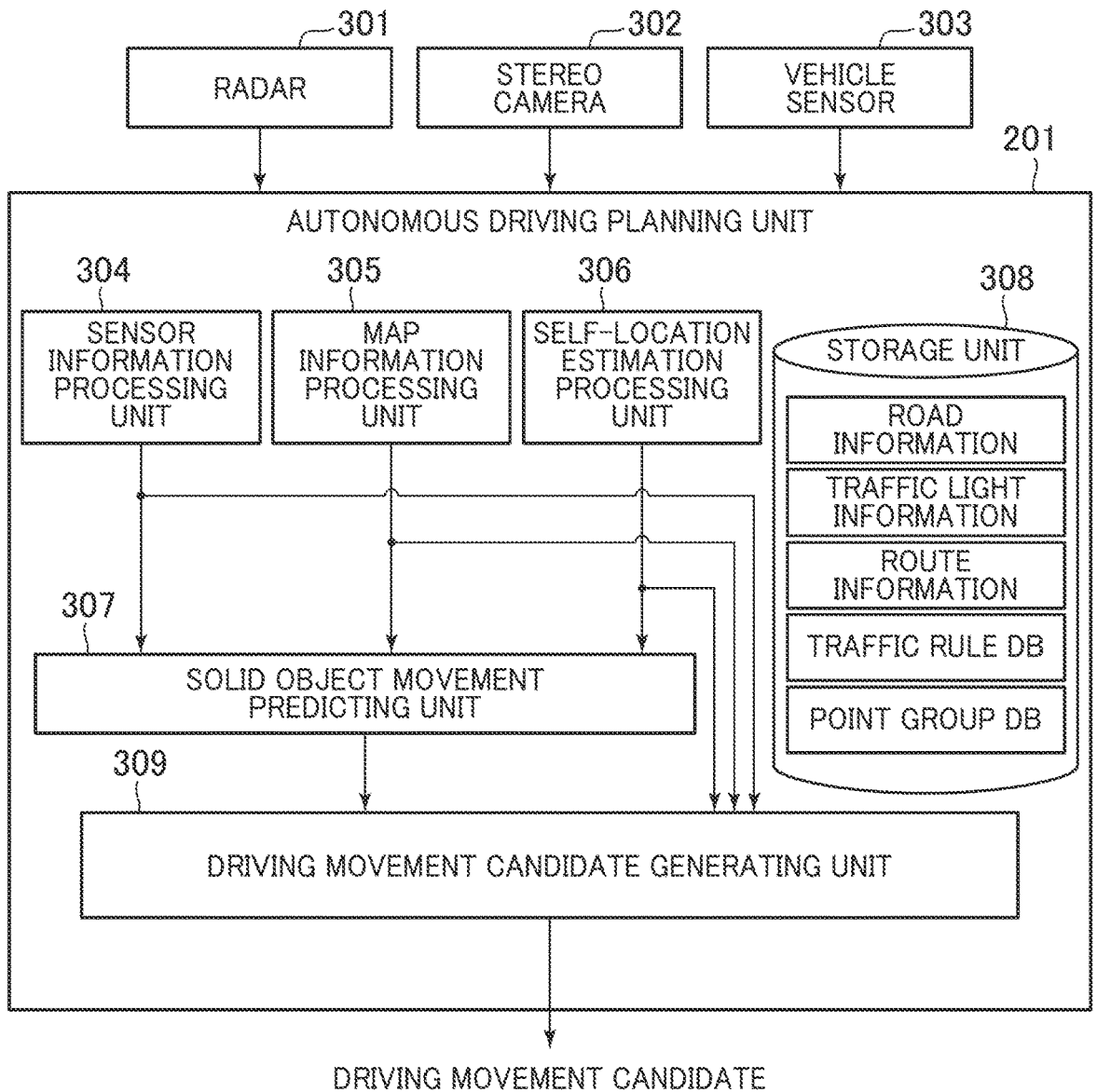

FIG. 7
(a)
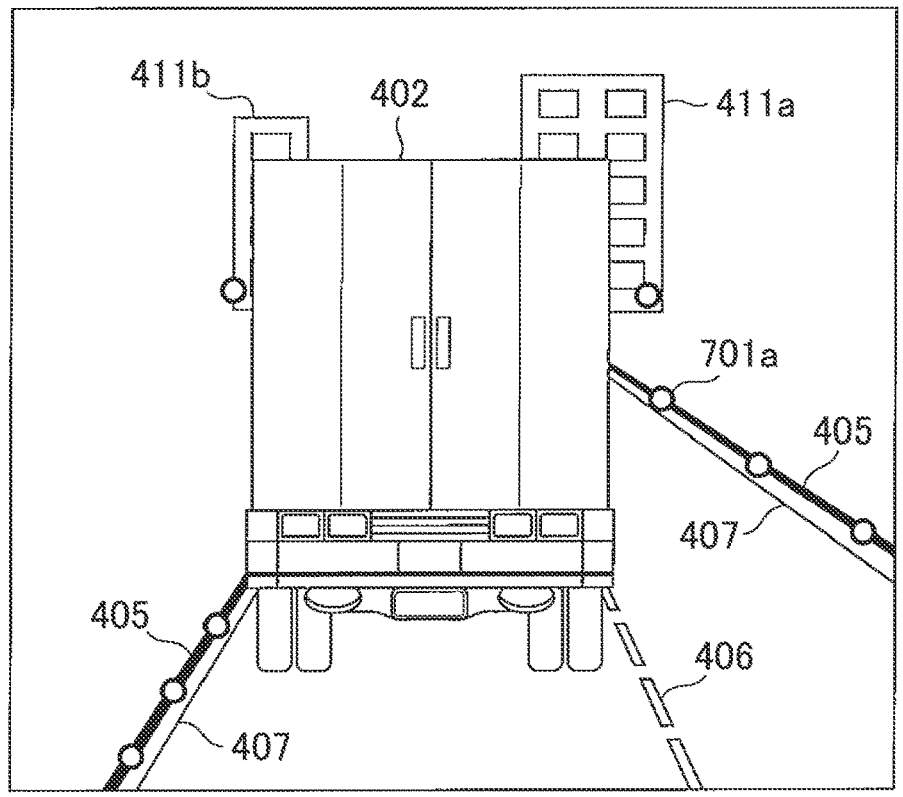
(b)
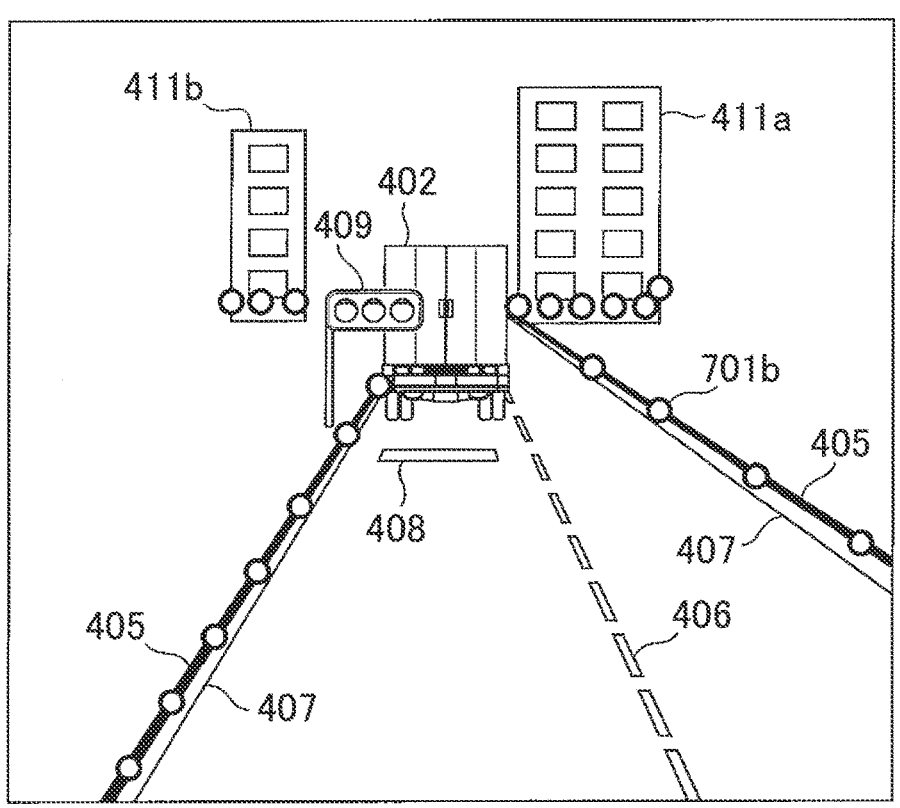

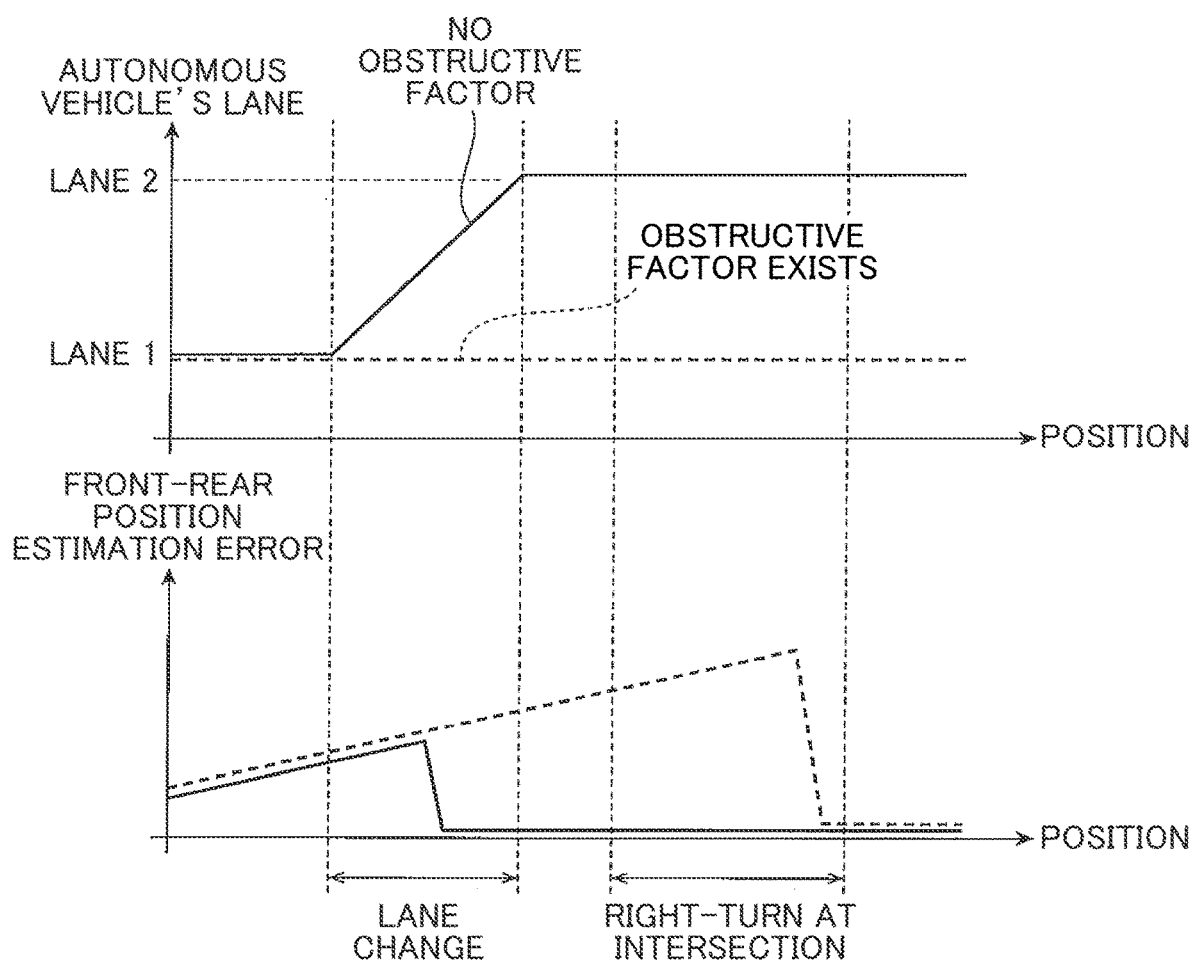

VEHICLE CONTROL DEVICE

TECHNICAL FIELD

The present invention relates to a vehicle control device controlling a vehicle such as a car, particularly, a vehicle having a target track generation function and a trace control function during autonomous driving travel.

BACKGROUND ART

A system is conventionally developed, which obtains information of objects around an autonomous driving vehicle, plans driving movement of the autonomous driving vehicle on the basis of the obtained object information and map information, generates a track on the basis of the plan, and controls the autonomous driving vehicle so as to trace the track (refer to, for example, the following patent literature 1).

A method is also developed, of obtaining, at high precision, information of the self location of an autonomous vehicle for calculating information of a center line of a lane on which the vehicle should travel, as a base of a track to be generated from a map by matching a feature point map obtained by distance sensors (a laser range finder, an ultrasonic sensor, an infrared sensor, a camera, and the like) mounted in the vehicle and a point group map (refer to, for example, the following patent literature 2).

CITATION LIST

Patent Literature

Patent literature 1: Japanese Unexamined Patent Application Publication No. 2018-62261
Patent literature 2: Japanese Unexamined Patent Application Publication No. 2017-146893

SUMMARY OF INVENTION

Technical Problem

However, in the case where an obstacle such as a track or an advertising signboard exists between a solid object (feature) from which a feature point around an autonomous driving vehicle is obtained and a sensor for capturing the solid object, a necessary feature point cannot be obtained. Consequently, there is a case that matching with a point group map cannot be executed with high precision and, as a result, an error occurs in the self-location information. In the conventional way of thinking of autonomous driving, track generation and track tracing control based on high-precision position information are preconditions. Therefore, when an error in estimated self-location information is large, an error occurs in relative information between a road center point to be referred to and the autonomous vehicle position, and generation of a track and control of trace to a generated track become unstable. Consequently, there is a case that it is difficult to assure safety and ride comfort.

The present invention has been achieved in consideration of the circumstances and an object of the invention is to provide a vehicle control device capable of ensuring safety and ride comfort.

Solution to Problem

To achieve the object, a vehicle control device according to the present invention is characterized by having: a self-location estimation processing unit estimating self location of a vehicle by matching sensor information obtained from an external sensor mounted in the vehicle with map information including feature information as a point group; a solid object movement predicting unit predicting movement of an object as a factor of obstructing the matching with the map information; and a driving movement planning unit making a driving movement plan of the vehicle on the basis of a movement prediction result of the obstructive factor object, a result of estimation of a road situation at future time, and a result of estimation of a position error of the vehicle at future time.

Advantageous Effects of Invention

According to the present invention, a position error of an autonomous vehicle becomes smaller and acceleration/deceleration frequency of the autonomous vehicle and a vehicle steering amount is decreased so that deterioration in ride comfort can be prevented.

The other objects, configurations, operations, and effects of the present invention will become apparent by the following description of embodiments.

BRIEF DESCRIPTION OF DRAWINGS

FIG. 2 is a block diagram illustrating the configuration of the vehicle control device according to the first embodiment of the present invention.

FIG. 3 is a block diagram illustrating the configuration of an autonomous driving planning unit of the vehicle control device according to the first embodiment of the present invention.

FIGS. 7(a) and 7(b) are diagrams illustrating images in front of the vehicle, obtained by sensors.

FIG. 17 is a diagram expressing the relations of the position of an autonomous driving vehicle, lanes of the autonomous driving vehicle, and a front/rear position estimation error near an intersection depending on the presence/absence of an obstructive factor in the second embodiment of the present invention.

DESCRIPTION OF EMBODIMENTS

Hereinafter, embodiments of the present invention will be specifically described with reference to the drawings.

First Embodiment

Figure 1:
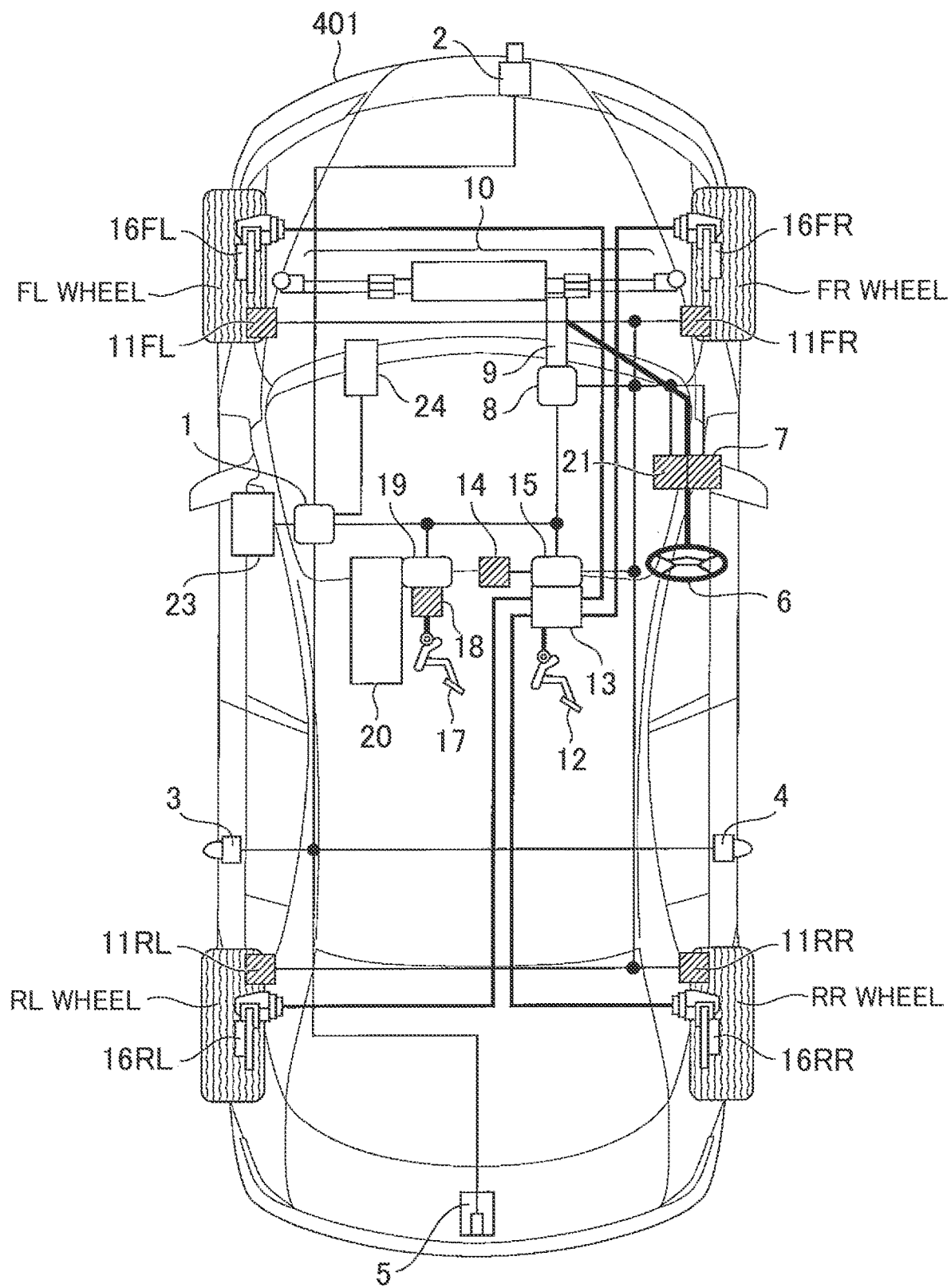
FIG. 1 is a block diagram illustrating the configuration of a travel drive system and sensors of an autonomous driving vehicle in which a vehicle control device according to a first embodiment of the present invention is mounted.

FIG. 1 is an explanatory diagram illustrating the general configuration of an autonomous driving vehicle (hereinafter, also simply called a vehicle or an autonomous vehicle) 401 in which a vehicle control device 1 according to a first embodiment of the present invention is mounted. In the diagram, FL wheel denotes a left front wheel, FR wheel denotes a right front wheel, RL wheel denotes a left rear wheel, and RR wheel indicates a right rear wheel.

The vehicle 401 of the embodiment illustrated has a steering control mechanism 10 as an actuator controlling a travel direction of the vehicle 401 on the basis of information (external information) of external sensors (hereinbelow, simply called sensors) 2, 3, 4, and 5 recognizing the outside, a brake control mechanism 13, and the vehicle control device 1 computing a command value to a throttle control mechanism 20. The vehicle 401 also has a steering control device 8 controlling the steering control mechanism 10 on the basis of a command value from the vehicle control device 1, a braking control device 15 adjusting a brake force distribution of each of the wheels (FL wheel, FR wheel, RL wheel, and RR wheel) by controlling the brake control mechanism 13 on the basis of the command value, an acceleration control device 19 adjusting a torque output of an engine (not illustrated) by controlling the throttle control mechanism 20 on the basis of the command value, and a display device 24 displaying a travel plan of the autonomous vehicle 401, movement prediction of a moving body existing in the periphery, and the like. Although the engine is used as a driving source in the embodiment, obviously, the present invention can be also applied to an electronic vehicle using a motor as a driving source.

The vehicle 401 has, as sensors 2, 3, 4, and 5 recognizing the outside, a camera 2 in the front part, laser radars 3 and 4 on the right and left sides, and a millimeter-wave radar 5 in the rear part and can detect relative distance and relative speed between the autonomous vehicle 401 and a peripheral vehicle. The vehicle 401 has a communication device 23 performing communication between a road and a vehicle or between vehicles. Although the combination of the sensors is illustrated as an example of the sensor configuration in the embodiment, the present invention is not limited to the combination but may employ a combination of an ultrasonic sensor, a stereo camera, an infrared camera, and the like. The sensor signals (output signals of the sensors) are supplied to the vehicle control device 1.

Although not specifically illustrated in FIG. 1, the vehicle control device 1 has, for example, a CPU, a ROM, a RAM, and an input/output device. In the ROM, the flow of a vehicle travel control which will be described hereinafter is stored. As the details will be described later, the vehicle control device 1 computes command values of the actuators 10, 13, and 20 for controlling vehicle travel in accordance with a generated travel plan. The control devices 8, 15, and 19 of the actuators 10, 13, and 20 receive command values of the vehicle control device 1 by communication and control the actuators 10, 13, and 20 on the basis of the command values.

Next, the operation of the brake will be described. In a state where the driver drives the vehicle 401, the pedal force on a brake pedal 12 of the driver is boosted by a brake booster (not illustrated), and hydraulic pressure according to the force is generated by a master cylinder (not illustrated). The generated hydraulic pressure is supplied to wheel cylinders 16FL to 16RR via the brake control mechanism 13. Each of the wheel cylinders 16FL to 16RR is configured by a cylinder, a piston, a pad, and the like (which are not illustrated). The piston is propelled by an operating fluid supplied from the master cylinder, and the pad coupled to the piston is pressed against a disc rotor. The disc rotor rotates with the wheel. Consequently, the brake torque acting on the disc rotor becomes a brake force acting between the wheel and the road surface. In such a manner, according to the brake pedal operation of the driver, the brake force can be generated to each wheel.

Although the details are not illustrated in FIG. 1, the braking control device 15 has, for example, a CPU, a ROM, a RAM, and an input/output device like the vehicle control device 1. To the braking control device 15, a brake force instruction value from a combine sensor 14 capable of detecting longitudinal acceleration, lateral acceleration, and yaw rate, wheel speed sensors 11FL to 11RR mounted in the wheels, and the above-described vehicle control device 1, and a sensor signal from a steering wheel angle detecting device 21 via the steering control device 8 are input. An output of the braking control device 15 is connected to the brake control mechanism 13 having a pump and a control valve which are not illustrated and can generate an arbitrary braking force in each wheel independently of the brake pedal operation of the driver. The brake control device 15 has the role of estimating spin and drift of the vehicle 401 and lock of the wheel on the basis of the above information, controlling the brake control mechanism 13 and the like to suppress them, and generating the brake force of the wheel to increase the driving stability of the driver. The vehicle control device 1 can generate an arbitrary brake force in the vehicle 401 by transmitting a brake force command value to the brake control device 15 and has the role of automatically applying a brake in autonomous driving in which the operation of the driver does not exist. The present invention is not limited to the brake control device 15. Another actuator such as a brake-by-wire may be used.

Next, the operation of the steering will be described. In a state where the driver drives the vehicle 401, the steering torque and the wheel angle input by the driver via a steering wheel 6 are detected by a steering torque detecting device 7 and the steering wheel angle detecting device 21, respectively and, on the basis of the information, the steering control device 8 controls a motor 9 to generate assist torque. Although not specifically illustrated in FIG. 1, the steering control device 8 also has, for example, a CPU, a ROM, a RAM, and an input/output device like the vehicle control device 1. By the resultant force of the steering torque of the driver and the assist torque by the motor 9, the steering control mechanism 10 moves and the front wheels are steered. On the other hand, according to the steering angle of the front wheels, the reaction force from the road surface is transmitted to the steering control mechanism 10 and transferred to the driver as road surface reaction force.

The steering control device 8 can generate torque by the motor 9 and control the steering control mechanism 10 independently of the steering operation of the driver. Therefore, the vehicle control device 1 can control the front wheels to an arbitrary steering angle by transmitting a steering force command value to the steering control device 8, and has the role of automatically performing steering in autonomous driving in which the operation of the driver does not exist. The present invention is not limited to the steering control device 8. Another actuator such as a steer-by-wire may be used.

Next, the accelerator will be described. A stroke amount of an accelerator pedal 17 of the driver is detected by a stroke sensor 18 and input to the acceleration control device 19. Although not specifically illustrated in FIG. 1, like the vehicle control device 1, the acceleration control device 19 also has, for example, a CPU, a ROM, a RAM, and an input/output device. The acceleration control device 19 adjusts the throttle angle in accordance with the accelerator pedal stroke amount to control (the torque output of) the engine. By the above, the vehicle 401 can be accelerated according to the accelerator pedal operation of the driver. The acceleration control device 19 can control the throttle angle independently of the accelerator pedal operation of the driver. Therefore, the vehicle control device 1 can generate arbitrary acceleration in the vehicle 401 by transmitting an acceleration command value to the acceleration control device 19 and has the role of automatically performing acceleration in automatic driving in which the operation of the driver does not exist.

Next, the configuration of the vehicle control device 1 for autonomous driving of the embodiment will be described with reference to the block diagram illustrated in FIG. 2.

The vehicle control device 1 of the embodiment illustrated basically has: an autonomous driving planning unit 201 planning operation of an autonomous vehicle which will be described later, for automatically (in a automated manner) driving the autonomous vehicle to a destination; an autonomous parking planning unit 202 planning the operation of the autonomous vehicle for automatically parking the autonomous vehicle in a parking space in a parking lot or the like; a vehicle motion control unit 203 generating a command value for controlling the vehicle motion of an autonomous driving vehicle; and an actuator control unit 204 for controlling the actuators 10, 13, and 20 such as the steering, the brake, and the engine (via the control devices 8, 15, and 19). It is assumed that those units are mounted in different controllers (CPUs). Consequently, a vehicle network 205 for performing communication among the controllers is necessary. The vehicle network 205 may be wire-connected or wireless-connected. As a method of mounting the units to the controllers, there may be a case that the autonomous parking planning unit 202 and the autonomous driving planning unit 201 are mounted in the same hardware. There is also a case that the actuator control unit 204 is mounted in different hardware such as a controller for controlling an engine and a controller for controlling a brake.

Next, the configuration and operation of the autonomous driving planning unit 201 included in the vehicle control device 1 of the embodiment will be described with reference to the block diagram illustrated in FIG. 3.

The autonomous driving planning unit 201 of the embodiment illustrated mainly includes a sensor information processing unit 304, a map information processing unit 305, a self-location estimation processing unit 306, a solid object movement predicting unit 307, a storage unit 308, and a driving movement candidate generating unit (driving movement planning unit) 309. Each of the blocks will be described hereinafter.

In the example illustrated in FIG. 3, as sensors recognizing the outside, a radar 301 emitting an electric wave toward an object and measuring the reflected wave, thereby measuring distance and direction to the object, a stereo camera 302 capable of recording information also in the depth direction of the object by simultaneously shooting the object from a plurality of different directions, and a vehicle sensor 303 as a sensor group capable of detecting a vehicle state such as sensor information measuring the speed of the vehicle and the rotating speed of the wheels, information obtained by calculating an average position of the autonomous driving vehicle using the GNSS (Global Navigation Satellite System), destination information which is input by an occupant of the autonomous driving vehicle using a navigation system as an interface, and destination information designated by an operator or the like who is in a remote place by using wireless communication such as a telephone line are mounted. Information of the ambient environment obtained on the basis of those pieces of information is input to the sensor information processing unit 304 and converted to object information of a moving object or the like existing around the autonomous vehicle. As concrete object information, attribute information of a pedestrian, a bicycle, a vehicle, and the like and present positions and present speed vectors of them are extracted. Even when the speed obtained at present time is zero, a parked vehicle which may move in future and the like is included in the moving object. There is also the storage unit 308 storing road information and traffic signal information from the point where the autonomous vehicle starts autonomous driving to a target point and their peripheral areas, route information from the present position to the destination point, a traffic rule database in a travel interval, and the like. In the storage unit 308, a point group database used by the self-location estimation processing unit 306 is stored (the details will be described later). There is also the map information processing unit 305 for organizing light-state information of traffic lights through which the autonomous driving vehicle is supposed to pass into a form which can be used on the basis of information of center lines of lanes of roads and traffic light information necessary for performing autonomous driving on the basis of the information stored in the storage unit 308. The self-location estimation processing unit 306 which will be described later estimates the location in which the autonomous vehicle exists (to be specific, the absolute position on the map) on the basis of the peripheral information obtained by the sensors, the point group database, the steering angle of the vehicle, the vehicle speed, and information obtained by the GNSS.

Subsequently, the object information and the map information is input to the solid object movement predicting unit 307 (from the sensor information processing unit 304 and the map information processing unit 305). In the solid object movement predicting unit 307, the future position and speed information of each moving object (object prediction information) is computed on the basis of the input information. To predict the movement of each moving object, a position R(X(T), Y(T)) in future time T of each object is predicted on the basis of the object information. As a concrete prediction method, in the case where the present position of a moving object is Rn0(Xn(0),Yn(0)) and present speed is Vn(Vxn, Vyn), prediction computation is performed on the basis of the following linear prediction equation (1).

Equation (1)

$$Rn(Xn(T),Yn(T))=Vn(Vxn,Vyn)\times T+Rn0(Xn(0),Yn(0)) \quad (1)$$

In this computing method, it is assumed that each object is in uniform linear motion in which the object moves while maintaining present speed in future time. By the method, the solid object movement predicting unit 307 can perform prediction of many objects in short time.

After that, the solid object movement prediction result and the map information is input to the driving movement candidate generating unit 309 (from the solid object movement predicting unit 307 and the map information processing unit 305). As will be described later, in the driving movement candidate generating unit 309, a driving movement candidate (also called driving movement plan) in which an autonomous driving vehicle (autonomous vehicle) does not collide another vehicle and a solid object existing around the autonomous vehicle and which is adapted to the route information and the present vehicle state (such as speed, position, and direction) is calculated and output.

Next, a driving movement candidate generating method based on (adding) self-location estimation information output from the self-location estimation processing unit 306 of the embodiment will be described by using a schematic diagram of a representative scene illustrated in FIG. 4. In the scene illustrated in FIG. 4, the autonomous vehicle 401 makes an autonomous driving travel. The road has one oncoming lane, and a vehicle 402 ahead (hereinafter, also called forward vehicle) travels in front of the autonomous vehicle 401. It is assumed that the vehicle 402 ahead has features of relatively large height and width like a track or trailer. There are fences 405 each disposed as a border between the road and a sidewalk. It is also assumed that the autonomous vehicle 401 can obtain the information of road end point sequences 407 as ends of the road in which the vehicle can park safely and a road center line 406 by a method of obtaining detection information of the stereo camera 302 (FIG. 3) or an autonomous vehicle peripheral map based on the position information of the autonomous vehicle 401. Prediction track information 404 of the vehicle 402 ahead as an output result of the solid object movement predicting unit 307 is also obtained. The result of computing a prediction track until five seconds later of the vehicle 402 ahead is illustrated.

The details of processes in the self-location estimation processing unit 306 in the embodiment will now be described. FIG. 5 is a point group map which is output from a point-group database (stored in the storage unit 308) at the time of travel in the road area illustrated in FIG. 4. At the time of estimating the self location by the self-location estimation processing unit 306, by matching feature point information obtained by the sensors in the autonomous vehicle position and the point group associated with the position information by using an ICP (Iterative Closest Point) as one of methods of adjusting the relations of position postures so as to match two point groups (ICP matching method), the self location can be estimated with high precision. For example, in FIG. 4, edge information of the fences 405 and solid objects 411a and 411b can be detected by performing image conversion in a sensor obtaining an image. Consequently, by preliminarily forming a map in which the edge information is associated with the position information by using a network-type RTK measuring method and a distance sensor (for example, a lidar), a feature-point map can be obtained by using a distance sensor (for example, a stereo camera) and an image sensor (a monocular camera) which are relatively cheap. In the point group map (map including feature information as a point group) illustrated in FIG. 5, feature points (501a, 501b, 502a, and 502b) between the solid objects 411a and 411b and the fences 405 are associated with positions and recorded.

Figure 6:
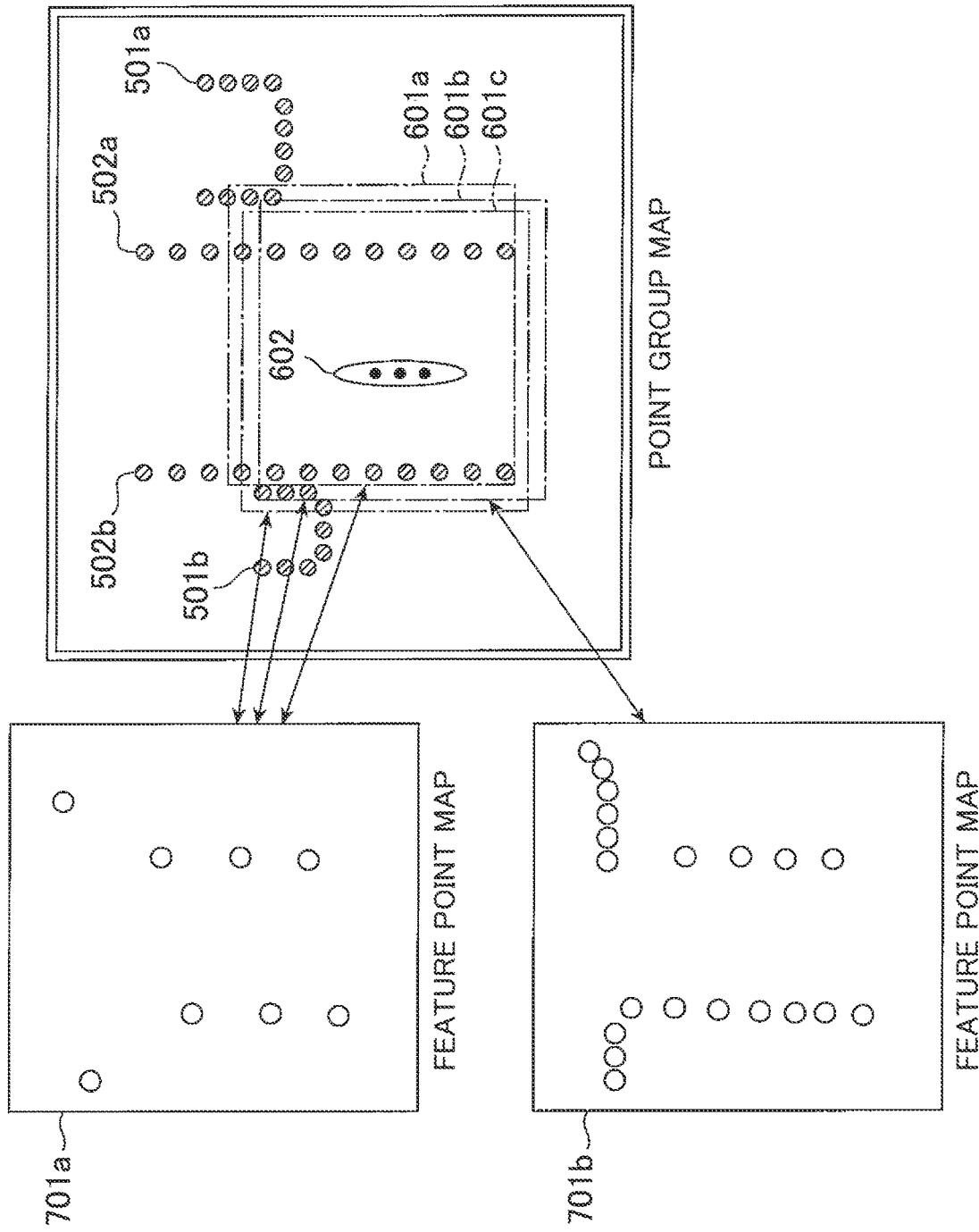
FIG. 6 is an explanatory diagram illustrating a point group map in which a feature point map and a point group database are matched.

Next, matching between a feature point map obtained by in-vehicle sensors and the point group map will be described with reference to FIG. 6. In the case of using the above-described ICP matching method, when the number of feature points of the feature-point map obtained by the sensors is small, matching with the point group map (point group database) may not be accomplished. It is the case such that, although distances among point groups corresponding to feature points are calculated to perform enlargement, reduction, rotation, or the like so that the sum of the distances becomes the minimum in the above-described ICP matching method, since the number of feature points is small, distance sums in a plurality of places become almost equal, and the position cannot be specified. Consequently, when the number of feature points obtained by the sensor is large, 601b is output as a candidate (matching candidate map) of a place a feature-point map 701b obtained from the image illustrated in FIG. 6 matches, and variation in a matching center point 602 is small. When the number of feature points obtained by the sensor is small, 601a to 601c are output as candidates (matching candidate maps) of the place a feature point map 701a obtained by the image illustrated in FIG. 6 matches. Variation in the matching center point 602 becomes a position estimation error.

Figure 4:
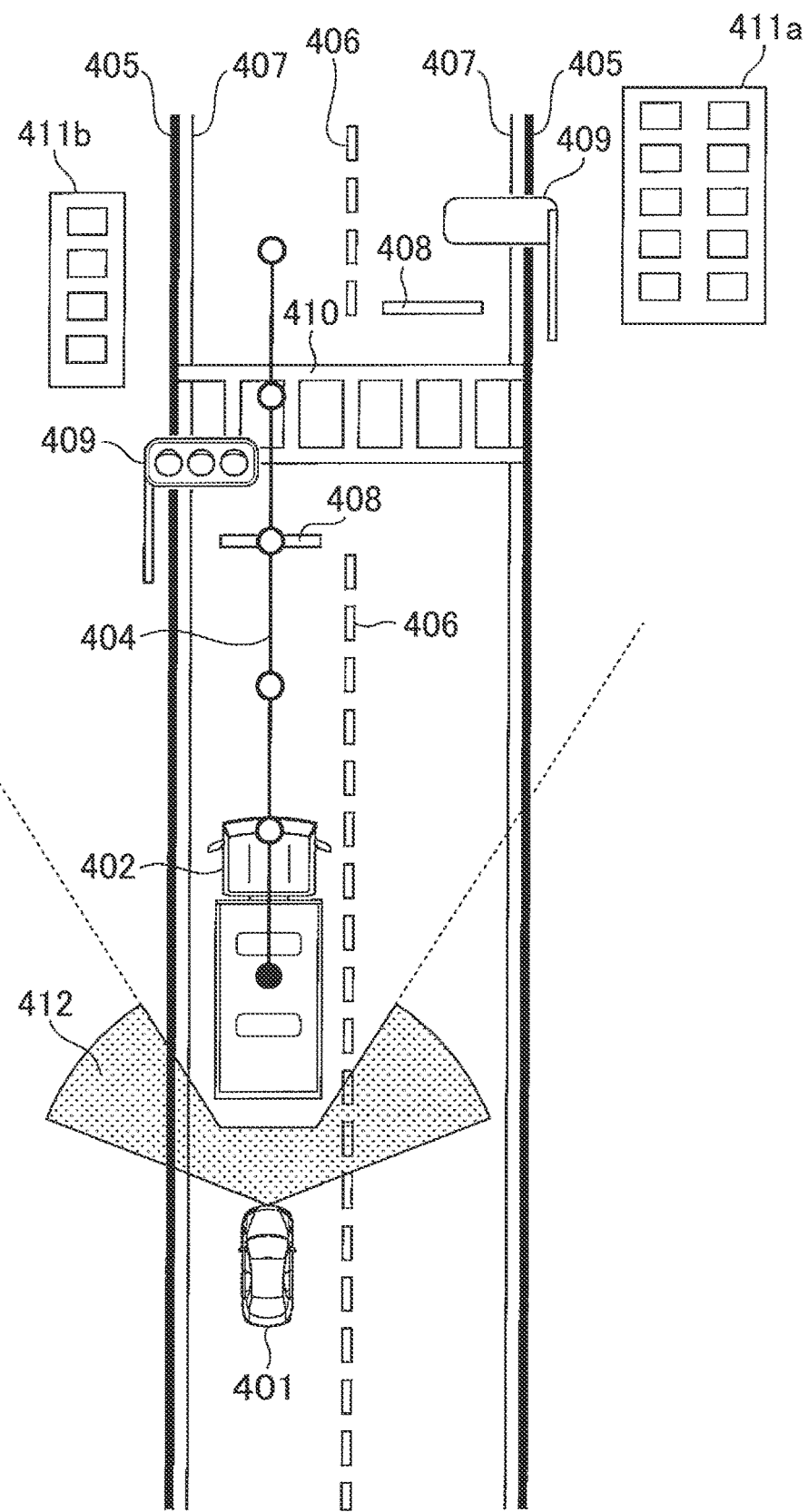
FIG. 4 is an explanatory diagram illustrating an example in which the vehicle control device according to the first embodiment of the present invention is applied.
Figure 5:
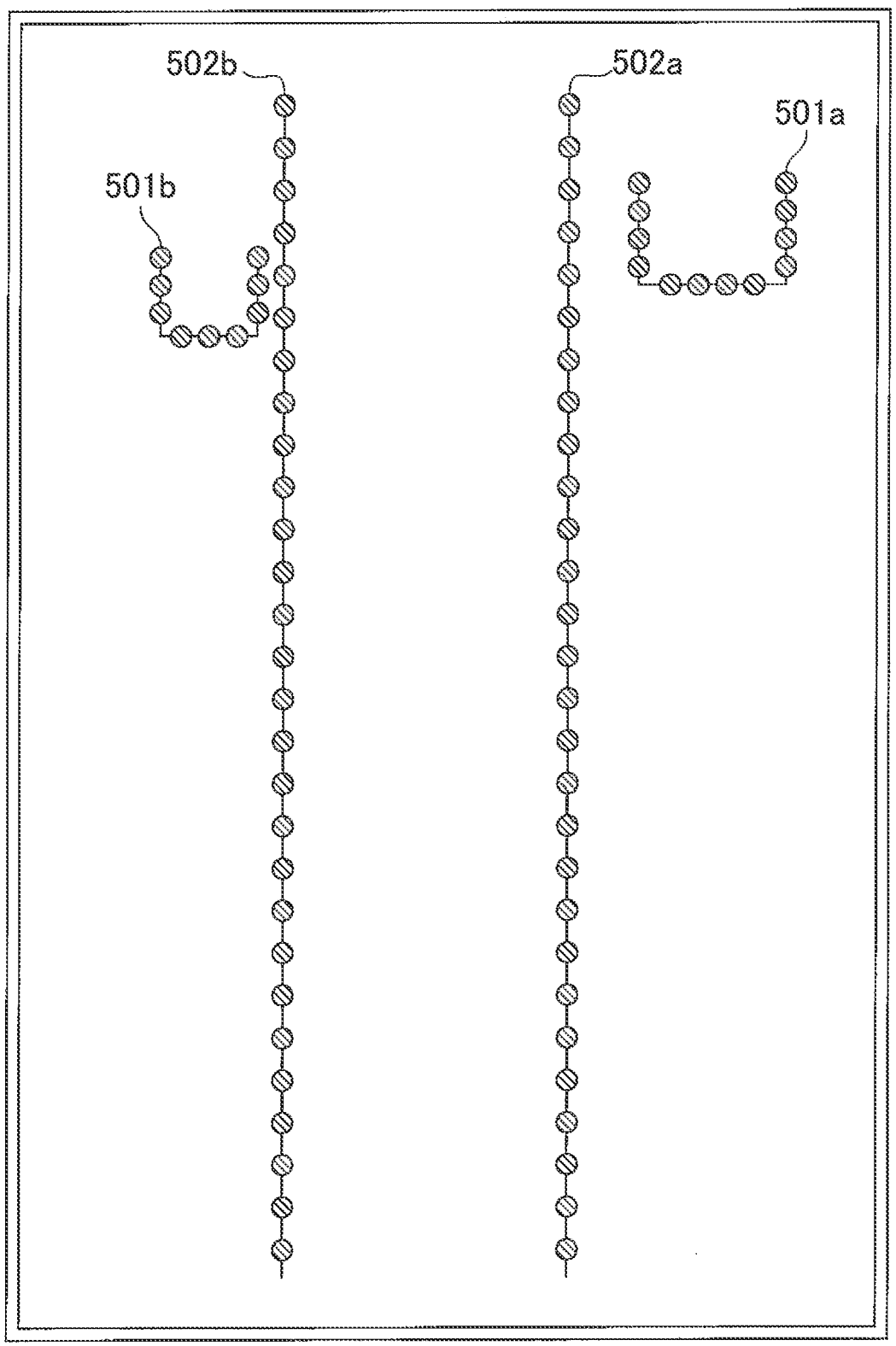
FIG. 5 is an explanatory diagram illustrating a point group map used by a self-location estimation processing unit of the vehicle control device according to the first embodiment of the present invention.

Particularly, when a track or the like having large height or width travels as the vehicle 402 ahead in front of the autonomous vehicle 401 as illustrated in FIG. 4, since a sensor (for example, a stereo camera) capable of shooting only the forward of the vehicle has a narrow view angle (sensor detection range 412) and, in addition, the vehicle 402 ahead occupies a major region in an image obtained, there is a case that desired feature points cannot be obtained. FIG. 7(a) illustrates a result (image) obtained by an in-vehicle sensor in the circumstance illustrated in FIG. 4. FIG. 7(a) corresponds to the feature point map 701a in FIG. 6. Although the feature point map 701a is obtained from this result, there is a case that since the number of feature points is small, the above-described matching fails.

In the embodiment, therefore, feature point acquisition prediction at future time is performed on the basis of a movement prediction result of an object (the vehicle 402 ahead in the scene of FIG. 4) which is a factor of obstructing the matching in the sensor detection range and a road situation presumption result of the circumstance and, on the basis of the result, a driving movement candidate (driving movement plan) of the autonomous vehicle 401 is generated.

Figure 8:
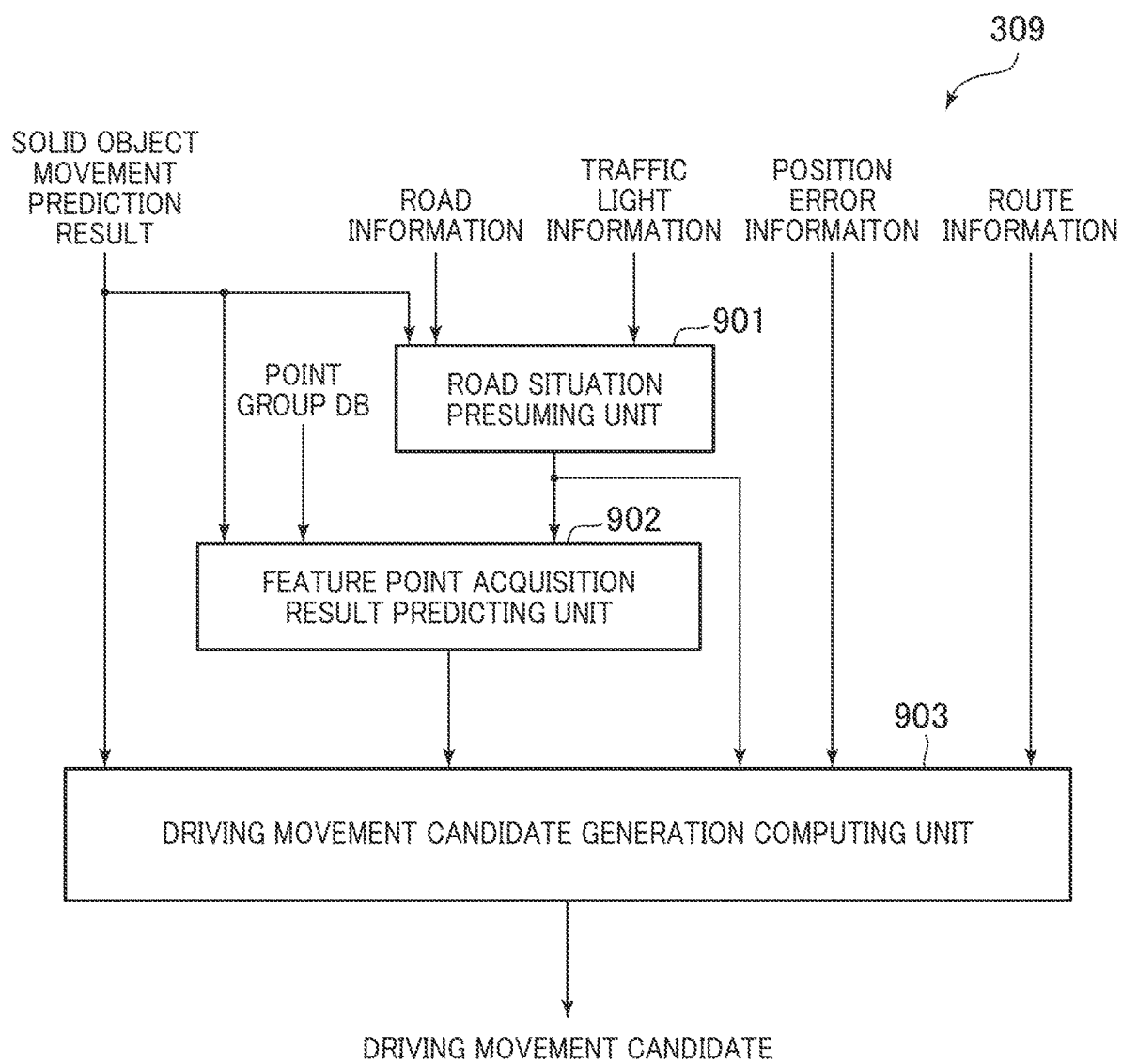
FIG. 8 is a block diagram illustrating a driving movement candidate generating unit of the vehicle control device according to the first embodiment of the present invention.

Next, the driving movement candidate generating unit 309 of the embodiment will be described more specifically with reference to FIG. 8. The driving movement candidate generating unit 309 of the embodiment illustrated in the diagram is configured by including, mainly, a road situation presuming unit 901, a feature point acquisition result predicting unit 902, and a driving movement candidate generation computing unit 903. Each of the blocks will be described hereinafter.

In the road situation presuming unit 901, on the basis of a solid object movement prediction result from the solid object movement predicting unit 307 and road information and traffic light information from the map information processing unit 305, a road situation in future (at future time) is predicted. For example, in the situation illustrated in FIG. 4, a future road situation is presumed from future traffic light prediction information based on present light-on information of the traffic light 409, network communication, information at the time of passage in the past, and the like, presence/absence information of pedestrians around an Intersection 410 obtained from a solid object movement prediction result, and travel patterns up to the present time of the vehicle 402 ahead (disturbance factor). As an example, in a state after five seconds from now, a situation is presumed that no vehicle exists in front and rear of the autonomous vehicle and the traffic light 409 indicates red (stop).

Subsequently, in the feature point acquisition result predicting unit 902, from the road situation presumption result from the road situation presuming unit 901, the solid object movement prediction result from the solid object movement predicting unit 307, the point group database from the storage unit 308, and the like, a result of acquiring the feature points obtained in a future position is predicted. As a predicting method, an autonomous vehicle peripheral situation when the autonomous vehicle 401 travels in some travel patterns (in other words, drives in a plurality of driving movement patterns) can be predicted on the basis of the road situation prediction result. On the basis of angle-view information of the sensor in that position (in each of the travel patterns), whether a feature (solid object) registered in the point-group database exists in the sensor detection range or not is predicted, and a feature point acquisition result obtained from the result is predicted. For example, in the situation illustrated in FIG. 4, at future time (for example, after four seconds), since the vehicle 402 ahead moves far, it is predicted that the number of feature points obtained by the sensor of the autonomous vehicle 401 increases. FIG. 7(b) illustrates the example. FIG. 7(b) corresponds to the feature point map 701b in the above-described FIG. 6.

The (process details of) driving movement candidate generation computing unit 903 will now be described with reference to the flowchart of FIG. 9.

In basic movement candidate generation in step S801, context recognition of the peripheral environment is performed on the basis of the peripheral sensor, the map information, and the like, and (a plurality of) basic movement candidates are generated. For example, in the situation of FIG. 4, first, it is considered that the autonomous vehicle travels so as to follow the vehicle 402 ahead on the present lane. It is also considered that the autonomous vehicle passes the vehicle 402 ahead. As an example of another scene, when there are a plurality of travel lanes, the autonomous vehicle may change the lane. When there is a parked vehicle, the autonomous vehicle may pass the parked vehicle. Movement candidates generated here are stored in the memory.

In the future position error estimation of step S802, a position error in the case of making a target movement for a movement candidate stored in the memory is estimated on the basis of the result obtained by the feature point acquisition result predicting unit 902. For example, in the situation of FIG. 4, when a basic movement of travelling on the present lane so as to follow the vehicle 402 ahead is taken, it is predicted that the number of feature points obtained in feature positions is small, so that it is estimated that the amount of the position error information increases.

In error condition determination of step S803, for each movement candidate stored in the memory, an error condition determination is performed by comparing a feature position error estimation result of step S802 and an error condition necessary for the movement candidate. For example, in the situation of FIG. 4, in the case of taking the basic movement of travelling so as to follow the vehicle 402 ahead on the present lane, at the time of stop at a stop line 408, as a lengthwise position error increases, the autonomous vehicle stops suddenly just before the stop line 408, and the ride comfort deteriorates. Consequently, when there is a movement candidate which does not satisfy an error condition (which will be described later) regarding ride comfort and the like in movement candidates stored in the memory, the computing unit advances to step S804. When all of the movement candidates satisfy the error condition regarding ride comfort and the like, the computing unit breaks through the loop process and ends the flow.

In position-error-corrected movement candidate generation of step S804, an attempt is carried out to decrease a future position error by making a change to a movement candidate which does not satisfy the condition in the error condition determination of step S803. As a changing method, first, the case of changing a movement in the time (speed) axis direction (front-rear direction) is examined and, next, the case of changing a movement in the lateral direction is examined. In the case of changing the movement in the time (speed) axis direction (front-back direction), in the situation of FIG. 4, a movement candidate of travel while keeping a distance on the present lane without tracking the vehicle 402 ahead is generated. For this, there is a method of searching a movement candidate with a smaller error exploratorily in the time axis direction on the basis of the feature point acquisition result prediction result. Next, in the case of changing the movement in the lateral direction, a method of attempting a lane change or the like is considered.

Figure 10:
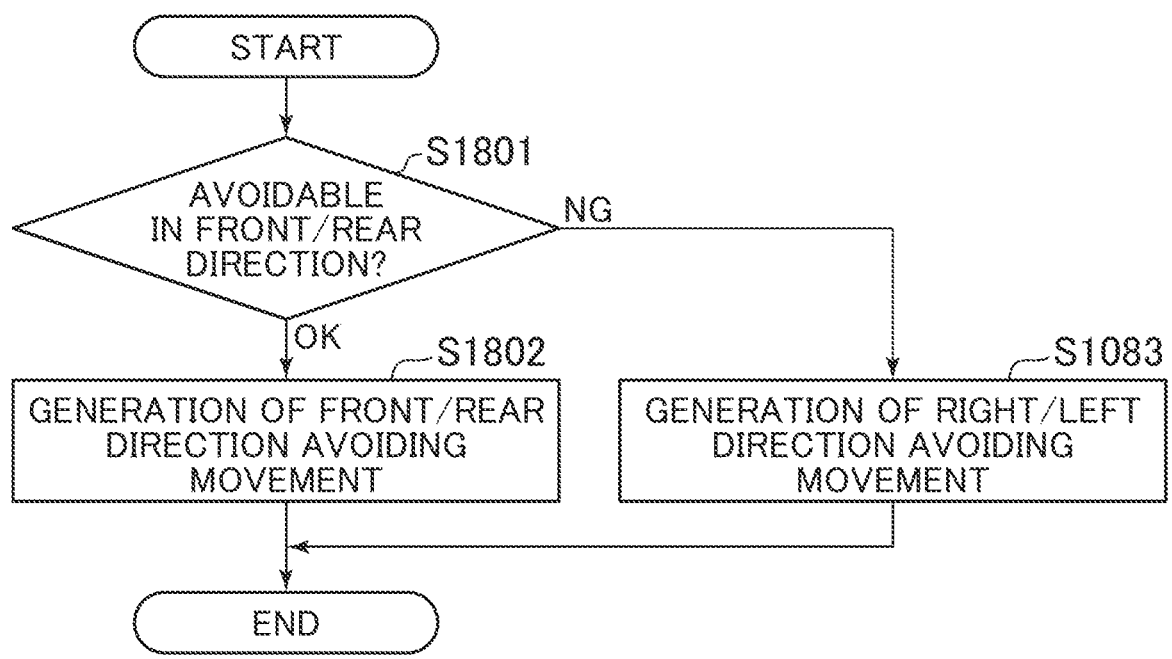
FIG. 10 is a diagram illustrating a flowchart of generation of a position error correcting movement candidate in processes performed by the driving movement candidate generation computing unit.

The position-error-corrected movement candidate generation in step S804 will be described with reference to the flowchart of FIG. 10. As illustrated in FIG. 10, in step S1801, whether it is avoidable in the front-rear direction or not is determined. In the case where it is determined that the error condition is satisfied only by an avoidance movement in the front-rear direction with respect to an obstructive factor object (for example, the vehicle 402 ahead) in the repeating process by the error condition determination of S803, generation of a front-rear direction avoiding movement candidate of S1802 is performed. On the other hand, the avoiding movement in the front-rear direction is rejected in the repeating process by the error condition determination of S803 and it is determined that the error condition cannot be satisfied only by the avoiding movement in the front-rear direction with respect to the obstructive factor object (for example, the vehicle 402 ahead), generation of a right-left direction avoiding movement of S1803 is performed. In such a manner, a movement of avoiding a vehicle ahead in the front-rear direction or the right-left direction (driving movement candidate) is generated.

In the movement candidate memory exchanging process of step S805, the position-error-corrected movement candidate generated in step S804 replaces the movement candidate which does not satisfy the error condition in the memory storing the movement candidates. The computing unit moves again to the step S802.

In such a manner, (the driving movement candidate generating unit 309 of) the autonomous driving planning unit 201 predicts a feature point acquisition result at future time when the autonomous vehicle 401 travels in some travel patterns on the basis of the road situation presumption result from the road situation presuming unit 901 and the solid object movement prediction result from the solid object movement predicting unit 307, estimates a future position error of the autonomous vehicle 401 on the basis of the prediction result, and generates a driving movement candidate (driving movement plan) in which safety and ride comfort are considered on the basis of the estimation result.

The autonomous parking planning unit 202 included in the vehicle control device 1 of the embodiment is basically almost the same as the above-described autonomous driving planning unit 201 except for generating (computing) a driving movement candidate in autonomous parking (to a parking space) in a parking space in a parking lot or the like as a destination.

Figure 11:
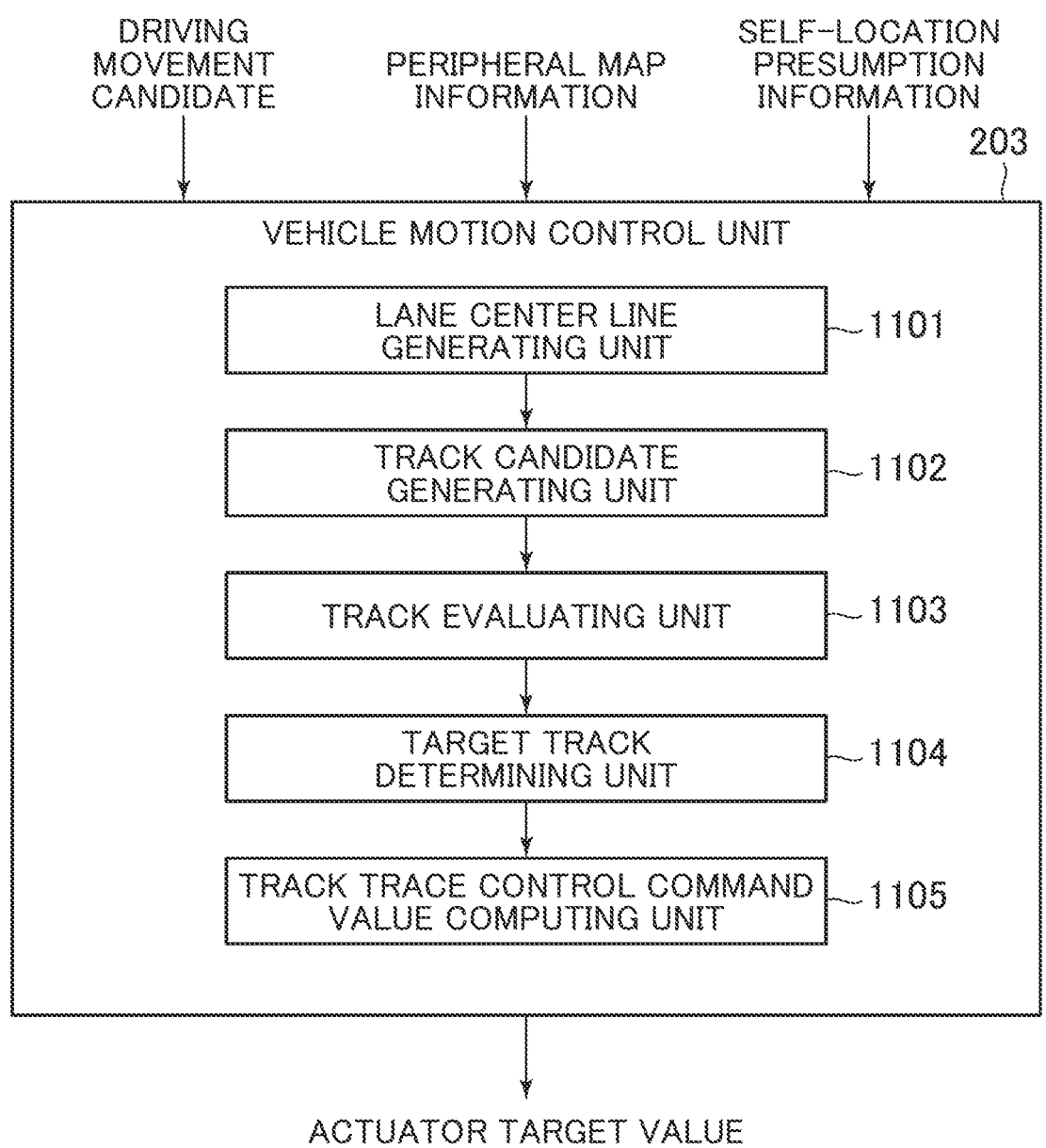
FIG. 11 is a block diagram illustrating the configuration of a vehicle movement control unit of the vehicle control device according to the first embodiment of the present invention.

Next, the configuration and operation of the vehicle motion control unit 203 included in the vehicle control device 1 of the embodiment will be described with reference to FIG. 11.

The vehicle motion control unit 203 computes command values (also called actuator target values and track tracing control command values) of the actuators 10, 13, and 20 on the basis of driving movement candidates, peripheral map information, and self-location estimation information output from the autonomous driving planning unit 201 and the autonomous parking planning unit 202. In the vehicle motion control unit 203, a lane center line generating unit 1101, a track candidate generating unit 1102, a track evaluating unit 1103, a target track determining unit 1104, and a track trace control command value computing unit 1105 exist. Each of the blocks will be described hereinafter.

Figure 12:
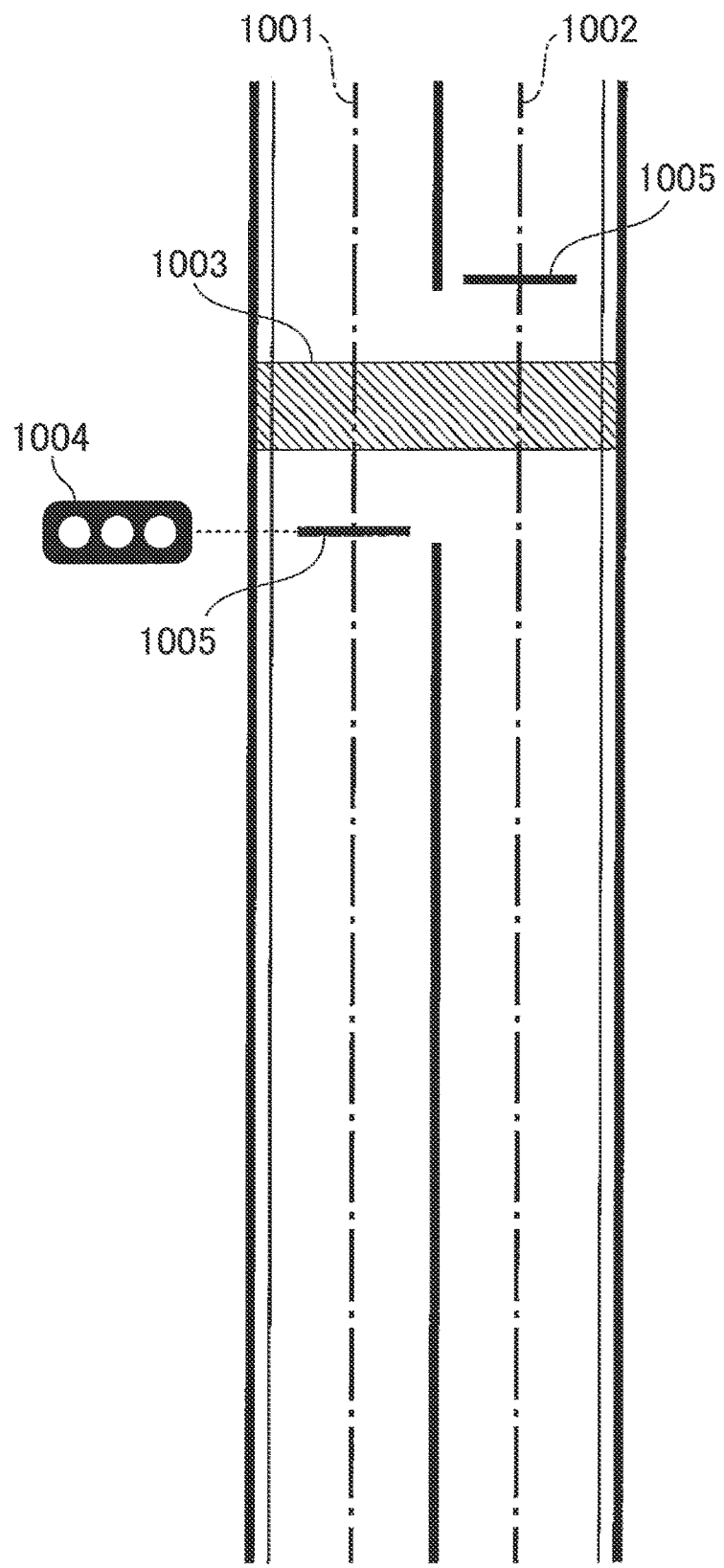
FIG. 12 is an explanatory diagram illustrating a high-precision road map used by an autonomous driving planning unit and a vehicle motion control unit of the vehicle control device according to the first embodiment of the present invention.

In the lane center line generating unit 1101, on the basis of self-location presumption information and peripheral map information, a center point sequence (expressed by latitude and longitude or $(X\_1, Y\_1), \ldots, (X\_N, Y\_N)$ on plane coordinates) of a lane in which the autonomous vehicle exists is calculated. For example, in the example illustrated in FIG. 12, based on pedestrian crossing information 1003, traffic light information 1004, stop line position information 1005, lane center point sequence (oncoming lane) 1002, and the like, a lane center point sequence (autonomous vehicle line) 1001 is calculated.

The track candidate generating unit 1102 generates a track candidate on the basis of a drivable area and peripheral map information. The drivable area denotes an area in which an autonomous driving vehicle can travel and stop without colliding against another vehicle and a solid object existing around the autonomous vehicle and which is adapted to route information and present vehicle states (speed, position, orientation, and the like).

Figure 13:
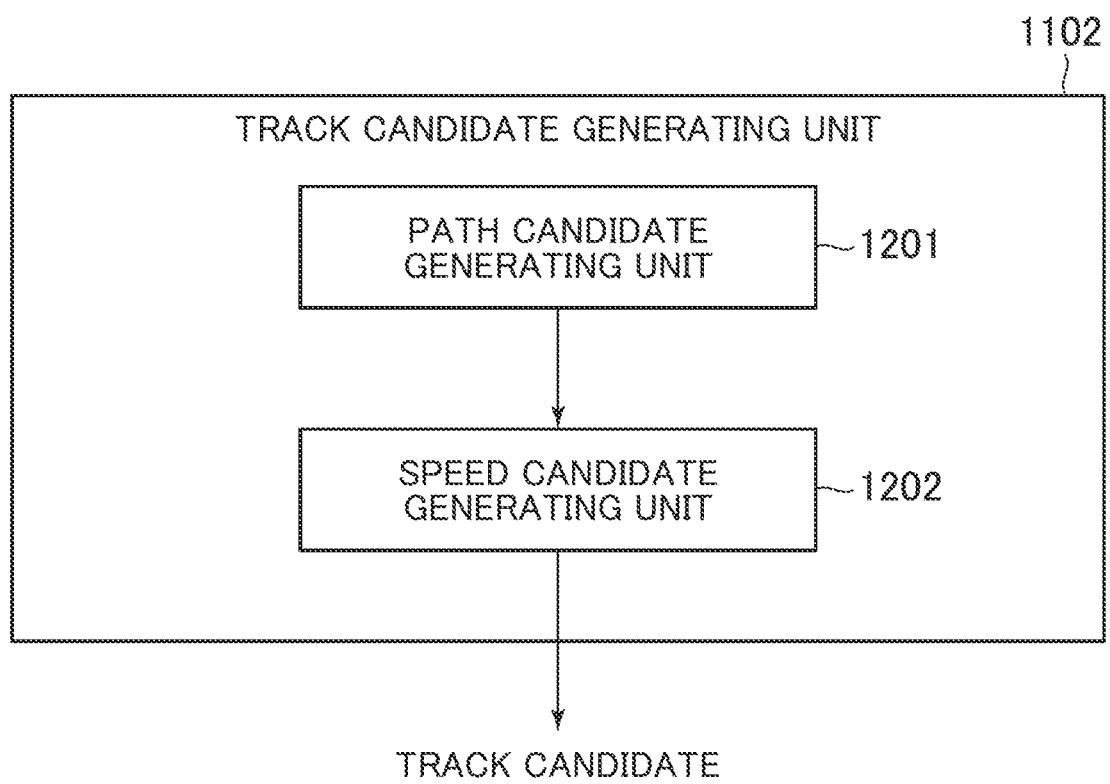
FIG. 13 is a block diagram illustrating the configuration of a track candidate generating unit of the vehicle control device according to the first embodiment of the present invention.

For example, as illustrated in FIG. 13, there is a method that the track candidate generating unit 1102 includes a path candidate generating unit 1201 and a speed candidate generating unit 1202. In this method, first, the path candidate generating unit 1201 computes a path (a point sequence of passage of the autonomous vehicle, which does not have time-series information) on the basis of the drivable area and the peripheral map information. A method of making a path satisfying the following variational equation (2) in the drivable area as a candidate is considered.

Equation (2)

$$\text{Min} \int_{t1}^{t2} [w1(\text{acceleration in lateral direction of autonomous vehicle})^2 + w2(\text{distance from target lane})^2 + w3(\text{vehicle head angle with respect to tangent of lane center line})^2] dt \quad (2)$$

As the method of computing the future driving state of the autonomous vehicle, a method of using a plant model of a vehicle is considered. As a plant model, for example, a bicycle model, a four-wheeled model, or the like may be used. The behavior (longitudinal acceleration, lateral acceleration, vehicle head angle, and the like) of a vehicle in the case of travel on a path computed by the variational equation (2) can be obtained from the model. Also in the speed candidate generating unit 1202 which will be described hereinafter, a future vehicle behavior can be predicted by using a similar model.

By changing weights (w1, w2, w3) of coefficients or changing an item to be evaluated, from the output of the equation (2), a plurality of paths can be generated. Other than an output of the equation (2), there is also a method of using a lane center point sequence of an autonomous line in the drivable area. For a plurality of path candidates (a single path candidate is also possible), the speed candidate generating unit 1202 may set speed sequence information satisfying the following equation (3) as a speed candidate. w4, w5, and w6 in the equation (3) are weights of coefficients.

Equation (3)

$$\text{Min} \int_{t1}^{t2} [W4(\text{acceleration in front-rear direction of autonomous vehicle})^2 + w5(\text{acceleration in lateral direction of autonomous vehicle})^2 + w6(\text{speed limit} - \text{autonomous vehicle speed})^2] dt \quad (3)$$

Since no vehicle exists rearward of the autonomous vehicle 401 in the scene illustrated in FIG. 4 in a range which can be taken as a speed candidate, a method of searching in a range equal to or lower than the legal speed specified for a road may be used.

Subsequently, the track evaluating unit 1103 evaluates a track candidate generated by the track candidate generating unit 1102. As the evaluating method, there is considered a method of setting each of track candidates as an evaluation item indicating ride comfort of the following equation (4) (for example, square of acceleration in the vehicle lateral direction, square of acceleration in the vehicle longitudinal direction, and linear sum of square of jerk obtained by differentiating the accelerations). v1, v2, v3, and v4 are weight coefficients.

Equation (4)

$$\text{ride comfort evaluation value} = v1 \times (\text{vehicle lateral direction acceleration})^2 + v2 \times (\text{vehicle longitudinal direction acceleration})^2 + v3 \times (\text{vehicle lateral direction jerk})^2 + v4 \times (\text{vehicle vertical direction jerk})^2 \quad (4)$$

Subsequently, the target track determining unit 1104 selects a candidate track having a high evaluation value on ride comfort from track candidates evaluated by the track evaluating unit 1103. At this time, a method is considered that the target track determining unit 1104 makes adjustment by adding weight to an evaluation value obtained by the track evaluating unit 1103 so as not to change a candidate track which is selected once for a predetermined time for the following reason. When there is a case that, for example, in the following computation cycle of selecting a candidate track intending to change a lane, the target track determining unit 1104 selects a candidate track intending the present lane without changing the lane, there is the possibility that an occupant feels anxiety about the motion of the vehicle.

The track trace control command value computing unit 1105 computes a steering command value, a brake operation amount, an engine output value, and the like so that the vehicle 401 traces the target track selected and determined by the target track determining unit 1104. In this method, command values (track trace control command values) of the steering, the brake, and the engine so as to trace the target track are computed for the target track determined by the target track determining unit 1104. As a method of computing a command value of the steering, a method of determining a steering amount so as to decrease an error from the target track is known. As a method of computing command values to the engine and the brake realizing target speed, a cruise control computing method capable of controlling a vehicle at conventional predetermined speed may be used.

Figure 14:
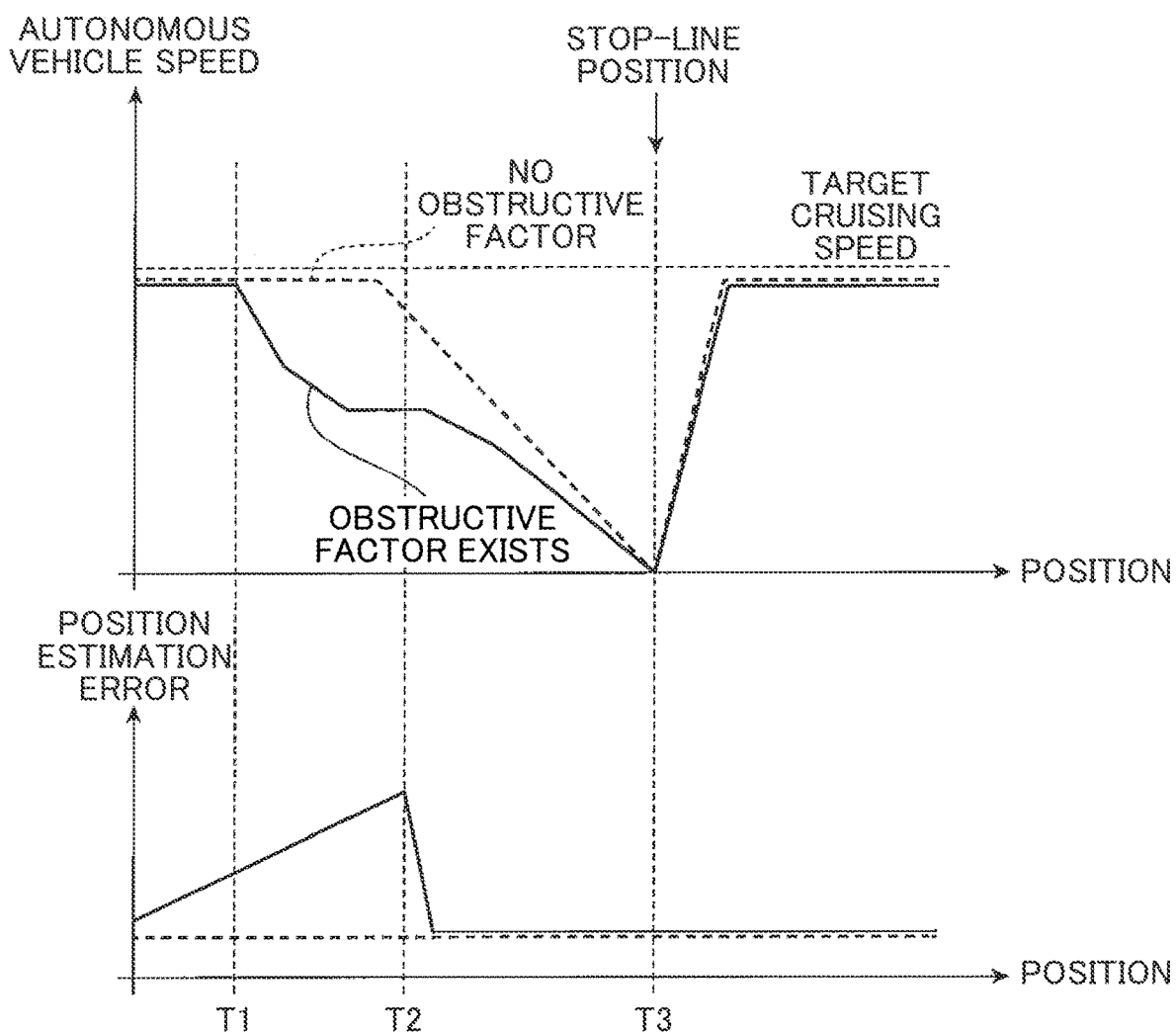
FIG. 14 is a diagram expressing the relations of the position of an autonomous driving vehicle, speed of the autonomous driving vehicle, and a position estimation error near a stop line depending on the presence/absence of an obstructive factor in the first embodiment of the present invention.

The effect in the situation illustrated in FIG. 4 with respect to the motion of the vehicle motion control unit 203 of the vehicle control device 1 of the embodiment will now be described with reference to FIG. 14. In FIG. 14, the solid line indicates the autonomous vehicle speed and position estimation error information in the case where a vehicle ahead as an obstructive factor of matching with map information exists, and the broken line indicates the autonomous vehicle speed and position estimation error information in the case where an obstructive factor of matching with map information does not exist.

When an obstructive factor exists, an action of stopping trace to a vehicle ahead and decreasing speed is selected on the basis of information of the vehicle ahead and the circumstance and information registered in a point group database at time T=T1. It is seen that, after that, as the obstructive factor disappears from the field of view, matching with the map information becomes possible, and the position error starts decreasing at time T=T2. Consequently, no sudden deceleration occurs for a stop line at time T=T3, so that autonomous driving which does not deteriorate ride comfort can be performed.

The actuator control unit 204 included in the vehicle control device 1 of the embodiment arbitrarily controls the actuators 10, 13, and 20 such as the steering, the brake, the engine, and the like (via the control devices 8, 15, and 19) on the basis of command values (track trace control command values) output from (the track trace control command value computing unit 1105) of the vehicle motion control unit 203 as described above, so that the vehicle control device 1 realizes the above-described autonomous driving.

As described above, the vehicle control device 1 of the embodiment has: the self-location estimation processing unit 306 estimating the self location (absolute position information on the map) of the vehicle by matching with map information including feature information as a point group from sensor information obtained from the external sensors 2 to 5 mounted in the vehicle; the solid object movement predicting unit 307 predicting movement of an object as an obstructive factor of matching with the map information; and the driving movement candidate generating unit (driving action planning unit) 309 making a driving action plan of the vehicle on the basis of the movement prediction result of the obstructive factor object, the result of presuming the road situation at future time, and an estimation result of a position error of the vehicle at future time. The driving movement candidate generating unit (driving action planning unit) 309 predicts a feature point acquisition result at future time on the basis of a movement prediction result of the obstructive factor object and a road situation presumption result in the sensor detection range of the external sensors 2 to 5, estimates a position error of the vehicle at future time on the basis of the prediction result, and makes a driving action plan of the vehicle on the basis of the estimation result.

As a result, the position error of the autonomous vehicle decreases, so that deterioration in ride comfort caused by decreasing the acceleration/deceleration frequency and the vehicle steering amount of the autonomous vehicle can be prevented.

Second Embodiment

Subsequently, with reference to FIGS. 15 to 17, a second embodiment of the present invention, particularly, a driving motion candidate generation computing unit (refer to FIG. 8) in the second embodiment will be described. The configuration itself of a vehicle control device in the second embodiment is similar to that in the foregoing first embodiment.

For example, in a road in which a lane is specified by a white line as in the scene illustrated in FIG. 4, lane center information is obtained by detection of a white line or the like, and the lane of a target path can be kept or changed. On the other hand, in the case of passing through an intersection, since there is no white line, self-location estimation is performed from the sensor information, and a target lane (lane center information) (passage line) to be traced has to be calculated from the self location and a map.

Figure 15:
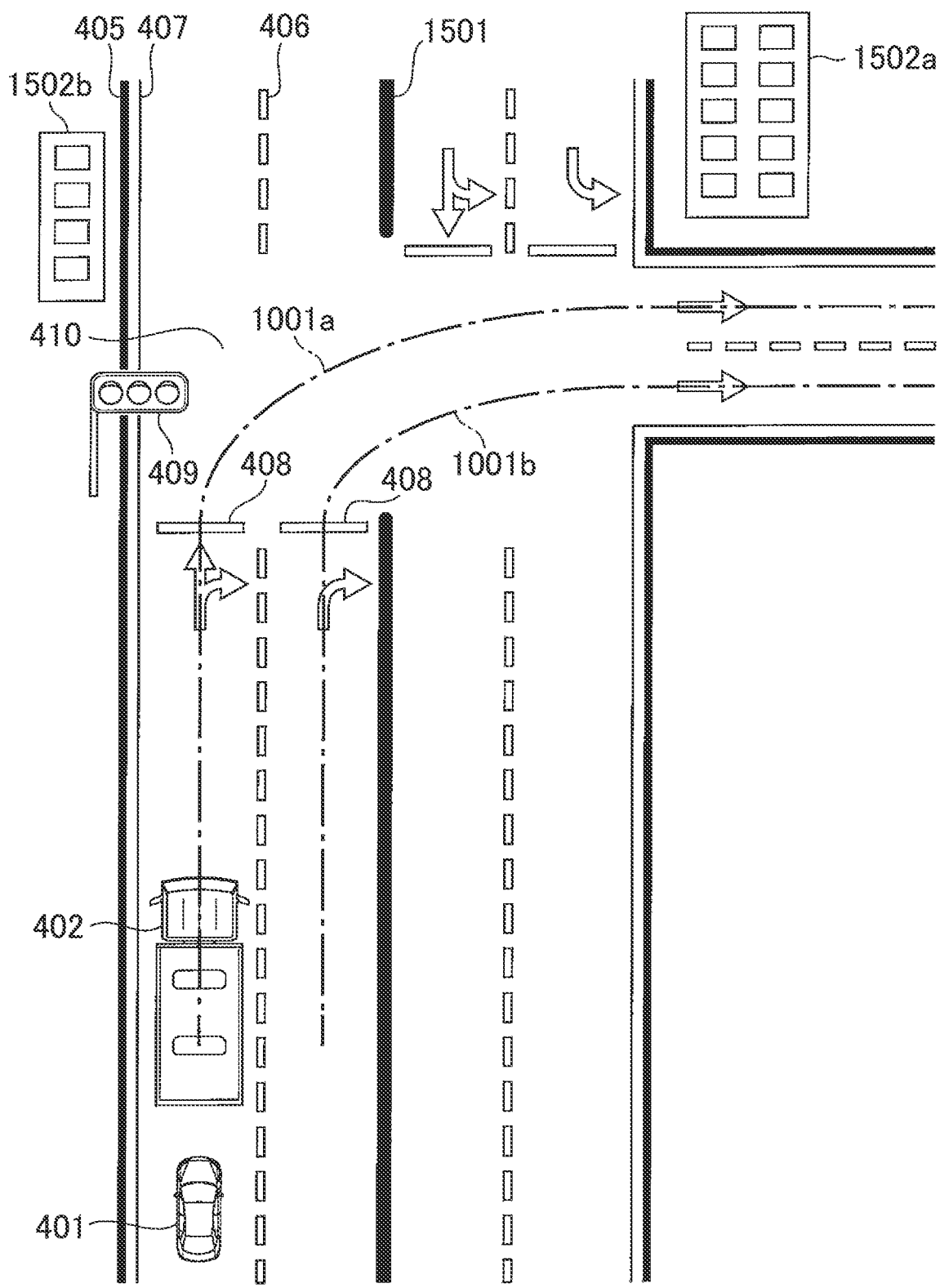
FIG. 15 is an explanatory diagram illustrating an example in which a vehicle control device according to a second embodiment of the present invention is applied.
Figure 16:
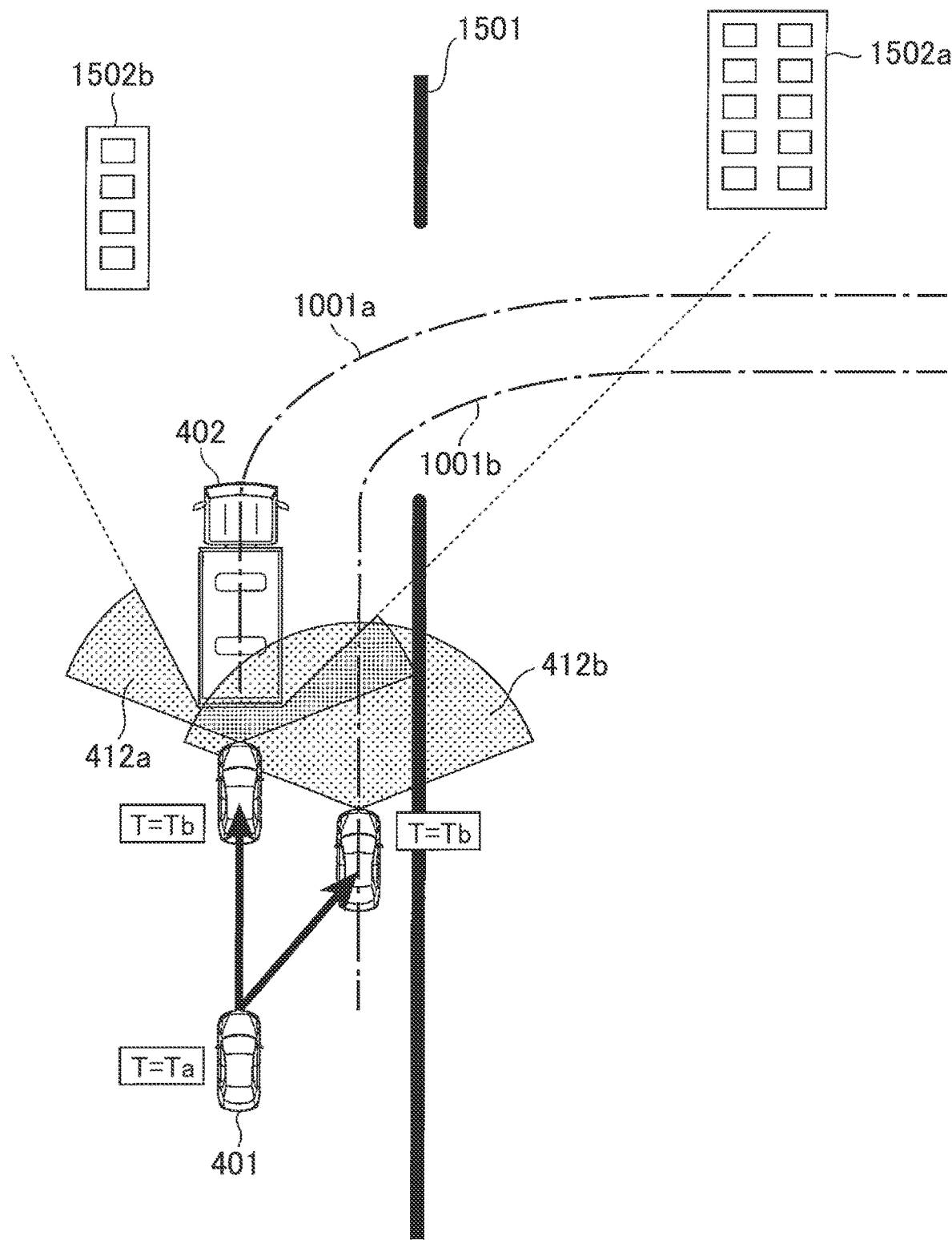
FIG. 16 is a diagram explaining the difference of feature points which can be detected by an autonomous driving vehicle when the autonomous driving vehicle makes different movements at future time in the second embodiment of the present invention.

FIG. 15 illustrates an example of a scene to which the embodiment is applied. The vehicle 402 ahead exists in front of the autonomous vehicle 401. The travel road is a road having two lanes each way, and the autonomous vehicle 401 and the vehicle 402 ahead travel on the left lane. The intersection 410 exists forward and a path to turn right at the intersection 410 is set for the autonomous vehicle 401 on the basis of path information which is set from a navigation system or the like. It is assumed that a vehicle can turn right in any of the right lane and the left lane. In a manner similar to the first embodiment, (the vehicle control device 1 of) the autonomous vehicle 401 is planned so that an error of the estimation position information of the autonomous vehicle 401 is decreased by using peripheral objects (a median strip 1501, a solid object 1502a, a solid object 1502b, and the like). On the other hand, since the vehicle 402 ahead exists, when the vehicle travels rearward of the vehicle 402 ahead, there is the possibility that feature points of the peripheral objects (the median strip 1501, the solid object 1502a, and the solid object 1502b) cannot be detected by the sensors, and an error cannot be decreased.

Figure 9:
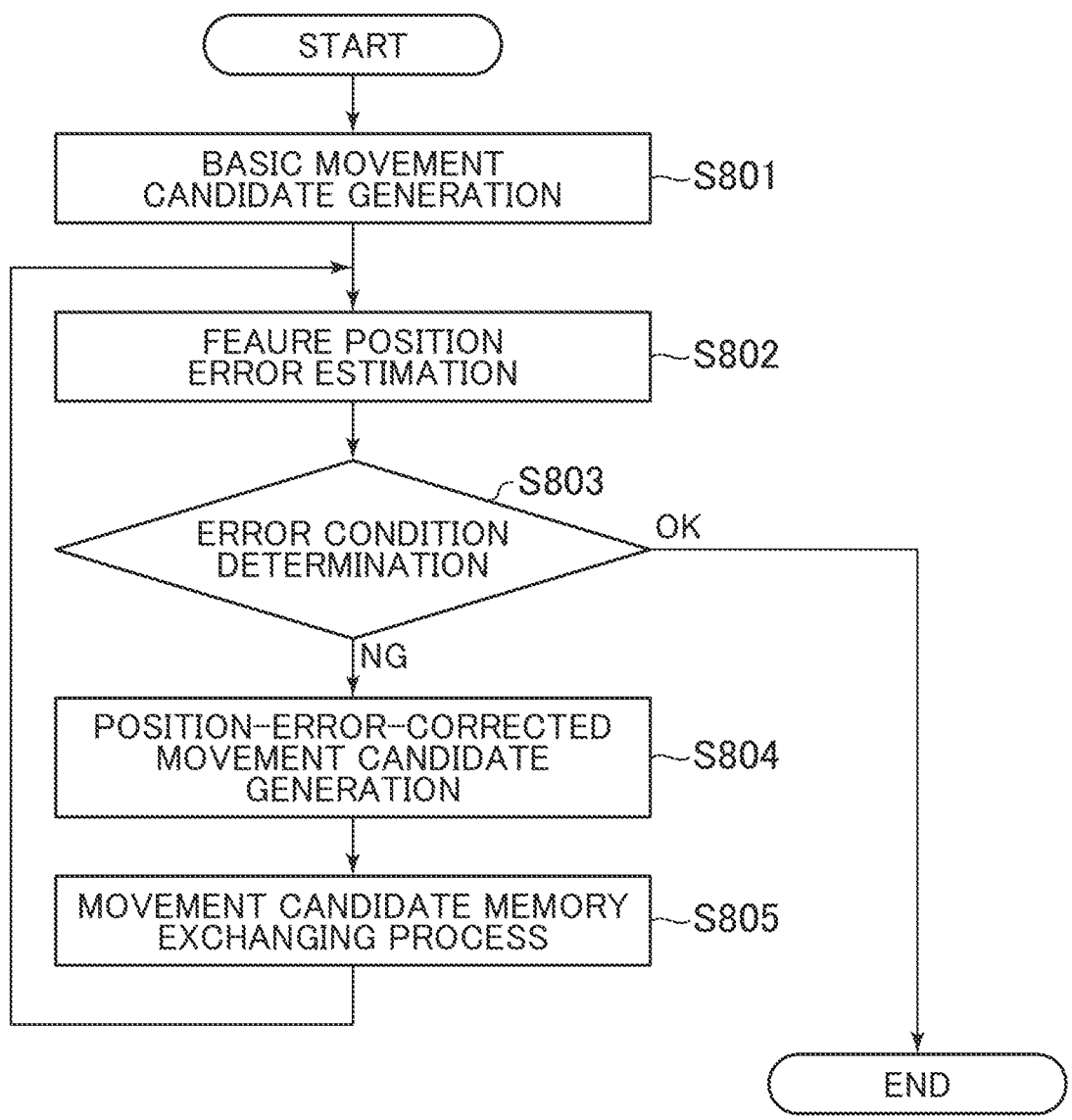
FIG. 9 is a diagram illustrating a flowchart of processes performed by a driving movement candidate generation computing unit.

Consequently, a position error corrected movement candidate is generated as described by using the step S804 in FIG. 9 and the flowchart of FIG. 10. That is, whether front-rear direction avoidance is possible or not is determined in step S1801. In the repeating process by the error condition determination of S803, movement in the front-rear direction avoidance is rejected. When it is determined that the error condition cannot be satisfied only by the avoiding movement in the front-rear direction for the obstructive factor object (for example, the vehicle 402 ahead), the right-left direction avoiding movement generation in S1803 is performed.

Consequently, a movement of avoiding the vehicle 402 ahead in the right-left directions (driving movement candidate) is generated.

In FIG. 15, 1001a expresses a lane center point sequence of the left lane (current travel lane), and 1001b expresses a lane center point sequence of the right lane (the lane to which the vehicle avoids in the right-left direction (concretely, the right side)).

Next, the movement of the autonomous vehicle and the peripheral environment in the case where a driving movement candidate in the right-left direction is generated will be described with reference to FIG. 16.

At time T=Ta, the autonomous vehicle 401 predicts the state of the autonomous vehicle 401 at time T=Tb and determines a movement (a driving movement candidate and a target track). In the case where the autonomous vehicle 401 is positioned rearward of the vehicle 402 ahead at time T=Tb, it is predicted that the peripheral objects (the median strip 1501, the solid object 1502a, the solid object 1502b, and the like) are hardly detected (the sensor detection range 412a). On the other hand, in the case where the lane is changed to the right lane as the avoiding movement in the right-left direction, it is predicted that the peripheral objects (the median strip 1501, the solid object 1502a, the solid object 1502b, and the like) can be detected by the sensors at time T=Tb (the sensor detection range 412b) and, as a result, it can be predicted that the position error of the autonomous vehicle 401 becomes equal to or less than a predetermined value.

Subsequently, with respect to the movement of the vehicle movement control unit 203 of the vehicle control device 1 of the embodiment, the effect in the situation of FIG. 15 will be described hereinafter with reference to FIG. 17. In FIG. 17, the case of turning right at the intersection while traveling on the lane 1 (left lane) is indicated by the dotted line, and the case of changing the lane from the lane 1 (left lane) to the lane 2 (right lane) halfway and turning right at the intersection is indicated by the solid line.

As illustrated in FIG. 17, in the case of changing the lane halfway, it is understood that the front-rear position estimation error decreases at the time of turning right at the intersection as compared with the case where the lane is not changed. Since the front-rear position estimation error decreases, the control of tracking the lane center line becomes stable in a scene of turning right at an intersection, so that it is expected that the ride comfort improves.

As described above, also in the second embodiment, in a manner similar to the foregoing first embodiment, a position error of an autonomous vehicle (particularly, a position error at an intersection having no white line) decreases, so that deterioration in ride comfort caused by decreasing the acceleration/deceleration frequency and the vehicle steering amount of the autonomous vehicle can be prevented.

The present invention is not limited to the foregoing embodiments but includes various modifications. For example, the forgoing embodiments have been described to make the present invention easily understood and are not necessarily limited to a device having all of the configurations described. A part of the configuration of a certain embodiment can be replaced with a configuration of another embodiment, or a configuration of an embodiment can be added to a configuration of another embodiment. With respect to a part of the configuration of each embodiment, addition, deletion, or replacement of another configuration can be performed.

A part or all of the configurations, functions, processing units, processing means, and the like may be realized by hardware by, for example, designing by an integration circuit. The configurations, functions, and the like may be realized by software in a manner such that a processor interprets a program realizing each function and executes it. Information of a program, a table, a file, and the like realizing each function can be stored in a storing device such as a memory, a hard disk, an SSD (Solid State Drive) or the like or a recording medium such as an IC card, an SD card, a DVD, or the like.

The control lines and information lines which are considered to be necessary for the description are illustrated, and all of control lines and information lines necessary for a product are not always illustrated. It may be considered that almost all of the components are mutually connected in practice.

LIST OF REFERENCE SIGNS

1 . . . vehicle control device
2 to 5 . . . external sensor
8 . . . steering control device
10 . . . steering control mechanism
13 . . . brake control mechanism
15 . . . braking control device
19 . . . acceleration control device
20 . . . throttle control mechanism
23 . . . communication device
24 . . . display device
201 autonomous driving planning unit
202 . . . autonomous parking planning unit
203 . . . vehicle motion control unit
204 . . . actuator control unit
205 . . . vehicle network
301 . . . radar
302 . . . stereo camera
303 . . . vehicle sensor
304 . . . sensor information processing unit
305 . . . map information processing unit
306 . . . self-location estimation processing unit
307 . . . solid object movement predicting unit
308 . . . storage unit
309 . . . driving movement candidate generating unit (driving movement planning unit)
401 . . . autonomous driving vehicle (autonomous vehicle)
402 . . . vehicle ahead (forward vehicle)
404 . . . prediction track information of forward vehicle
405 . . . fence
406 . . . road center line
407 . . . road end point sequence
408 . . . stop line
409 . . . traffic light
410 . . . intersection
411a, 411b . . . solid object
412, 412a, 4121b . . . sensor detection range
501a, 501b . . . feature points generated by solid objects
502a, 502b . . . feature points generated by fence
601a, 601b, 601c . . . matching candidate map
602 . . . matching center point (including error information)
701a, 701b . . . feature point map obtained from image
901 . . . road situation presuming unit
902 . . . feature point acquisition result predicting unit 903 . . . driving movement candidate generation computing unit
1001, 1001a, 1001b lane center point sequence (autonomous vehicle lane)
1002 . . . lane center point sequence (oncoming lane)
1003 . . . pedestrian crossing information
1004 . . . traffic light information
1005 . . . stop line position information
1101 . . . lane center line generating unit
1102 . . . track candidate generating unit
1103 . . . track evaluating unit
1104 . . . target track determining unit
1105 . . . track trace control command value computing unit
1201 . . . path candidate generating unit
1202 . . . speed candidate generating unit
1501 . . . median strip
1502a, 1502b solid object

The invention claimed is:

1. A vehicle control device mounted in a vehicle, the vehicle control device comprising:
a self-location estimation processing unit estimating self location of the vehicle by matching sensor information, the sensor information associated with a feature-point map having a center point, obtained from a sensor signal from an external sensor mounted in the vehicle with map information including feature information as a point group;
a solid object movement predicting unit predicting movement of an object as a factor of obstructing the matching with the map information; and
a driving movement planning unit making a driving movement plan of the vehicle on the basis of a movement prediction result of the obstructive factor object, a result of presumption of a road situation at a future time, and a result of estimation of a position error of the vehicle at the future time,
wherein the result of presumption of a road situation at the future time includes future traffic light prediction information,
wherein a candidate map of the map information is matched with the feature-point map, the candidate map having a center point and the feature information of the map information,
wherein the self-location estimation processing unit is configured to match the candidate map with the feature-point map by iteratively adjusting position postures of the feature information of the candidate map relative to corresponding feature information of the feature-point map,
wherein the position error includes a variation in the center point of the feature-point map and the center point of the candidate map matched with the feature-point map, and
wherein the vehicle control device is configured to generate a control command based on the driving movement plan to control an operation of the vehicle.

2. The vehicle control device according to claim 1,
wherein the driving movement planning unit predicts a feature point acquisition result at the future time on the basis of a movement prediction result of the obstructive factor object and a road situation presumption result at the future time within a sensor detection range of the external sensor, estimates a position error of the vehicle at the future time on the basis of the prediction result, and makes a driving movement plan of the vehicle on the basis of the estimation result.

3. The vehicle control device according to claim 2,
wherein the driving movement planning unit presumes a road situation at the future time when the vehicle drives in a plurality of driving movement patterns, and predicts a feature point acquisition result at the future time within a sensor detection range of the external sensor in the position of the vehicle at the future time in each of the driving movement patterns.

4. The vehicle control device according to claim 3,
wherein the driving movement planning unit presumes a road situation at the future time when the vehicle drives in a plurality of driving movement patterns, predicts whether a feature registered in a point-group database exists within a sensor detection range of the external sensor or not on the basis of information of the angle of view of the external sensor in a position of the vehicle at the future time, in each of the driving movement patterns, and predicts a feature point acquisition result at the future time on the basis of the prediction result.

5. The vehicle control device according to claim 2,
wherein the driving movement planning unit generates a plurality of movement candidates, stores them in a memory, and estimates a position error of the vehicle at the future time when a target movement is made for a movement candidate stored in the memory on the basis of a prediction result of a feature point acquisition result.

6. The vehicle control device according to claim 5,
wherein the driving movement planning unit makes an error condition determination by comparing an estimation result of a position error of the vehicle at the future time with a predetermined error condition for each of movement candidates stored in the memory.

7. The vehicle control device according to claim 6,
wherein the predetermined error condition includes a ride comfort condition.

8. The vehicle control device according to claim 7,
wherein the ride comfort condition includes a linear sum of square of acceleration of the vehicle and square of jerk.

9. The vehicle control device according to claim 6,
wherein the driving movement planning unit generates a movement candidate which avoids an obstructive factor object in the front-rear direction of the vehicle so as to satisfy the predetermined error condition.

10. The vehicle control device according to claim 6,
wherein, in the case where the predetermined error condition cannot be satisfied by the movement candidate which avoids an obstructive factor object in the front-rear direction of the vehicle, the driving movement planning unit generates a movement candidate of avoiding the obstructive factor object in the right-left direction of the vehicle.

11. The vehicle control device according to claim 1,
wherein the driving movement planning unit comprises:
a road situation presuming unit presuming a road situation at the future time;
a feature point acquisition result predicting unit predicting a feature point acquisition result at the future time on the basis of a movement prediction result of the obstructive factor object, a result of presuming a road situation at the future time, and a point group database; and
a driving movement candidate generation computing unit generating a movement candidate of the vehicle on the basis of a prediction result of a feature point acquisition result at the future time.

12. The vehicle control device according to claim 1, wherein, as the external sensor, a distance sensor capable of detecting a relative distance between the vehicle and an object existing in the outside is used.

* * * * *